(12) United States Patent
Teyeb et al.

(10) Patent No.: US 12,114,212 B2
(45) Date of Patent: Oct. 8, 2024

(54) CONFIGURING MULTI-RAT EARLY MEASUREMENTS

(71) Applicant: Telefonaktiebolaget LM Ericsson (PUBL), Stockholm (SE)

(72) Inventors: Oumer Teyeb, Montréal (CA); Patrik Rugeland, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 17/770,530

(22) PCT Filed: Oct. 21, 2020

(86) PCT No.: PCT/SE2020/051010
§ 371 (c)(1),
(2) Date: Apr. 20, 2022

(87) PCT Pub. No.: WO2021/080488
PCT Pub. Date: Apr. 29, 2021

(65) Prior Publication Data
US 2022/0394568 A1  Dec. 8, 2022

Related U.S. Application Data

(60) Provisional application No. 62/925,797, filed on Oct. 25, 2019.

(51) Int. Cl.
*H04W 36/00* (2009.01)
*H04W 36/30* (2009.01)
(Continued)

(52) U.S. Cl.
CPC ... *H04W 36/0058* (2018.08); *H04W 36/0085* (2018.08); *H04W 36/30* (2013.01); *H04W 48/12* (2013.01); *H04W 48/20* (2013.01)

(58) Field of Classification Search
CPC ......... H04W 36/0058; H04W 36/0085; H04W 36/30; H04W 48/12; H04W 48/20; H04W 48/08; H04W 24/08; H04W 24/10
See application file for complete search history.

(56) References Cited

U.S. PATENT DOCUMENTS

2016/0073428 A1  3/2016  Vutukuri et al.
2019/0037425 A1  1/2019  Hong et al.
(Continued)

FOREIGN PATENT DOCUMENTS

| CN | 105144787 A | 12/2015 |
| CN | 107251618 A | 10/2017 |
| KR | 2019 0012096 A | 2/2019 |

OTHER PUBLICATIONS

3GPP TS 36.331 v15.6.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Jun. 2019.
(Continued)

*Primary Examiner* — Jamal Javaid
(74) *Attorney, Agent, or Firm* — Baker Botts L.L.P.

(57) ABSTRACT

Systems and methods are disclosed herein for configuration of multi-Radio Access Technology (RAT) early measurements. In one embodiment, a method performed by a wireless communication device comprises receiving system information from a first cell of a first network node and receiving a dedicated release message from the first cell comprising idle mode measurement configurations for a first RAT and/or a second RAT. The method further comprises performing a reselection to a second cell served by a second network node and receiving system information from the second cell comprising idle mode measurement configurations for the first RAT and/or for the second RAT. The (Continued)

method further comprises determining idle mode measurement configurations to be applied while in the second cell based on the idle mode measurement configurations comprised in the dedicated release message from the first cell and the idle mode measurement configurations comprised in the system information from the second cell.

18 Claims, 14 Drawing Sheets

(51) Int. Cl.
    *H04W 48/12*    (2009.01)
    *H04W 48/20*    (2009.01)

(56) References Cited

U.S. PATENT DOCUMENTS

2019/0268963 A1    8/2019    Kim et al.
2021/0045000 A1*  2/2021    Dalsgaard ............. H04W 76/10

OTHER PUBLICATIONS

3GPP TS 38.331 v15.6.0; Technical Specification; 3rd Generation Partnership Project; Technical Specification Group Radio Access Network; NR; Radio Resource Control (RRC) protocol specification (Release 15)—Jun. 2019.

3GPP TSG-RAN WG2 Meeting #107; Prague, Czech; Source: Qualcomm Incorporated; Title: Summary of email discussion [106#36] [NR/eCA-DC]: measurement and reporting configuration (R2-1908673)—Aug. 26-30, 2019.

3GPP TSG RAN WG2 Meeting #107; Prague, Czech; Source: Qualcomm Incorporated; Title: Discussion on early measurements during inter-RAT cell reselection (R2-1908676)—Aug. 26-30, 2019.

3GPP TSG-RAN WG2 #107; Prague, Czech Republic; Source: Ericsson (Rapporteur); Title: Summary of email discussion [106#37] [NR/DCCA]: UE behaviour regarding idle measurement configurations and measurement results (R2-1910290)—Aug. 26-30, 2019.

3GPP TSG-RAN WG2 Meeting #107bis; Chongqing, China; Change Request; Title: Running CR for 36.331 for CA & DC enh; Source to WG: Rapporteur (Ericsson); Source to TSG: RAN2 (R2-1914189)—Oct. 14-18, 2019.

3GPP TSG-RAN #80; La Jolla, CA; Source: Ericsson, Nokia, Nokia Shanghai Bell, Huawei; Title: New WID on DC and CA enhancements (NR-DCCA_Enh) (RP-181469)—Jun. 11-14, 2018.

3GPP TSG-RAN #81; Gold Coast, Australia; Source: Ericsson, Nokia, Nokia Shanghai Bell, Huawei; Title: WID on Mutli-RAT Dual-Connectivity and Carrier Aggregation enhancements (RP-182076)—Sep. 10-13, 2018.

PCT International Search Report issued for International application No. PCT/SE2020/051010—Jan. 21. 2021.

PCT Written Opinion of the International Searching Authority issued for International application No. PCT/SE2020/051010—Jan. 21, 2021.

Official Communication issued for Japanese Patent Application No. 2020800745751—May 10, 2023.

* cited by examiner

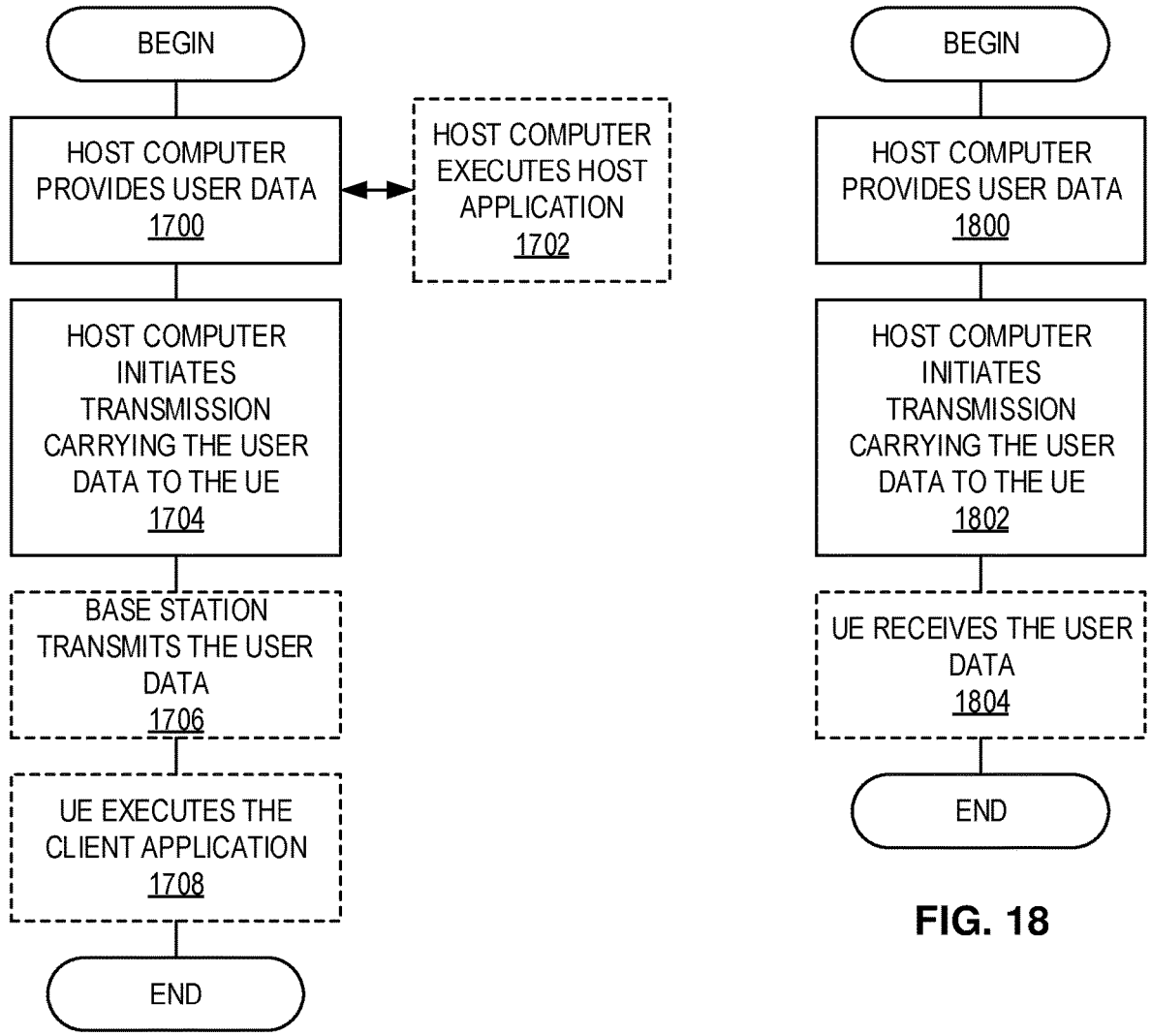

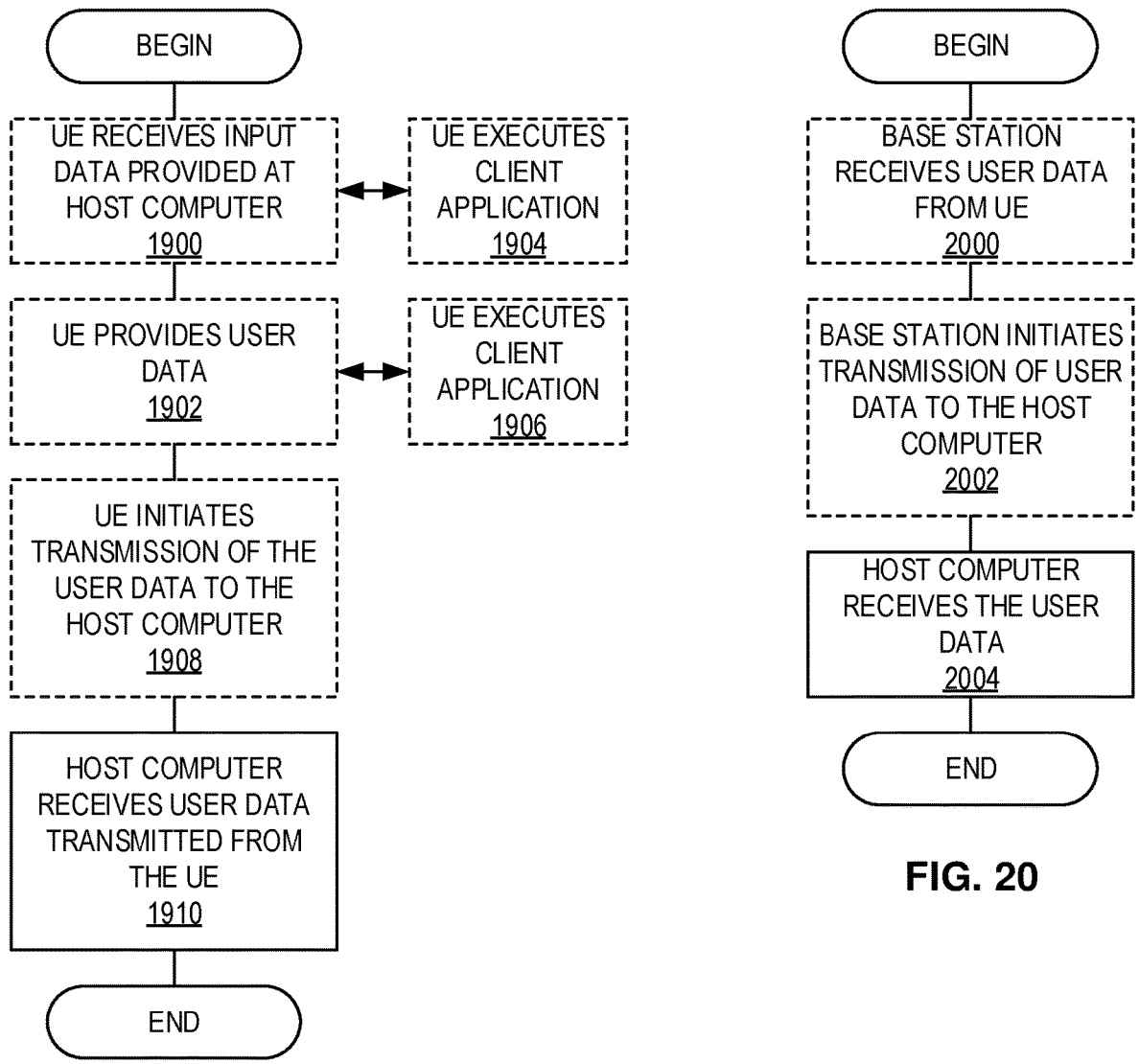

CONFIGURING MULTI-RAT EARLY MEASUREMENTS

PRIORITY

This nonprovisional application is a U.S. National Stage Filing under 35 U.S.C. § 371 of International Patent Application Serial No. PCT/SE2020/051010 filed Oct. 21, 2020, and entitled "CONFIGURING MULTI-RAT EARLY MEASUREMENTS" which claims priority to U.S. Provisional Patent Application No. 62/925,797 filed Oct. 25, 2019, both of which are hereby incorporated by reference in their entirety.

TECHNICAL FIELD

The present disclosure relates to a cellular communications system and, in particular, to measurements performed by a wireless communication device while in an idle mode.

BACKGROUND

Existing Solution for Early Measurements Upon Idle to Connected Transition in Long Term Evolution (LTE) Release 15

In LTE Release 15, it is possible to configure the User Equipment (UE) to report so called early measurements upon the transition from idle to connected state. These measurements are measurements that the UE can perform in idle state according to a configuration provided by the source cell. The intention is for the network to receive these measurements immediately after the UE gets connected so that the network can quickly setup Carrier Aggregation (CA) and/or other forms of Dual Connectivity (DC) (e.g., Evolved Universal Terrestrial Radio Access Network (E-UTRAN) New Radio (NR) Dual Connectivity (EN-DC), Multi-Radio Access Technology (RAT) Dual Connectivity (MR-DC), etc.) without the need for the network to first provide a measurement configuration (measConfig) when the UE is in RRC_CONNECTED mode and then wait for hundreds of milliseconds until samples are collected and monitored by the UE and then the first reports are triggered at the UE and transmitted to the network.

1.1.1 Measurement Configuration for Early Measurements Upon Resume in LTE

In regard to measurement configuration for early measurements upon resume in LTE, a first aspect of the existing solution, as standardized in E-UTRA, is described in Third Generation Partnership Project (3GPP) Technical Specification (TS) 36.331 section 5.6.20 Idle Mode Measurements. The UE can receive idle mode measurement configurations in the system information block 5 (SIB5) in the field MeasIdleConfigSIB-r15, indicating up to eight (8) cells or ranges of cell identities (IDs) on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
|---|

```
-- ASN1START
RRCConnectionRelease ::=                   SEQUENCE {
    rrc-TransactionIdentifier              RRC-TransactionIdentifier,
    criticalExtensions                     CHOICE {
        c1                                     CHOICE {
            rrcConnectionRelease-r8                RRCConnectionRelease-r8-IEs,
            spare3 NULL, spare2 NULL, spare1 NULL
        },
        criticalExtensionsFuture               SEQUENCE { }
    }
}
-- other info has been omitted
RRCConnectionRelease-v1530-IEs ::=         SEQUENCE {
    drb-ContinueROHC-r15                       ENUMERATED {true}              OPTIONAL,   -- Cond UP-EDT
    nextHopChainingCount-r15                   NextHopChainingCount           OPTIONAL,   -- Cond UP-EDT
    measIdleConfig-r15                         MeasIdleConfigDedicated-r15    OPTIONAL,   -- Need ON
    rrc-InactiveConfig-r15                     RRC-InactiveConfig-r15         OPTIONAL,   -- Need OR
    cn-Type-r15                                ENUMERATED {epc,fivegc}        OPTIONAL,   -- Need OR
    nonCriticalExtension                       SEQUENCE { }                   OPTIONAL
}
-- ASN1STOP
```

| MeasIdleConfig information element |
|---|

```
-- ASN1START
MeasIdleConfigSIB-r15 ::= SEQUENCE {
    measIdleCarrierListEUTRA-r15       EUTRA-CarrierList-r15,
    ...
}
MeasIdleConfigDedicated-r15 ::= SEQUENCE {
    measIdleCarrierListEUTRA-r15       EUTRA-CarrierList-r15             OPTIONAL,   -- Need OR
    measIdleDuration-r15               ENUMERATED {sec10, sec30, sec60, sec120,
                                                    sec180, sec240, sec300, spare},
    ...
}
EUTRA-CarrierListIdle-r15 ::= SEQUENCE (SIZE (1..maxFreqIdle-r15)) OF MeasIdleCarrierEUTRA-r15
MeasIdleCarrierEUTRA-r15::=            SEQUENCE {
    carrierFreq-r15                        ARFCN-ValueEUTRA-r9,
    allowedMeasBandwidth-r15               AllowedMeasBandwidth,
```

-continued

```
    validityArea-r15              CellList-r15                    OPTIONAL,  -- Need OR
    measCellList-r15              CellList-r15                    OPTIONAL,  -- Need OR
    reportQuantities              ENUMERATED {rsrp, rsrq, both},
    qualityThreshold-r15          SEQUENCE {
        idleRSRP-Threshold-r15        RSRP-Range                      OPTIONAL,  -- Need
OR
        idleRSRQ-Threshold-r15        RSRQ-Range-r13                  OPTIONAL   -- Need
OR
    }                                                             OPTIONAL,  -- Need OR
    ...
}
CellList-r15 ::=                  SEQUENCE (SIZE (1.. maxCellMeasIdle-r15)) OF PhysCellIdRange
-- ASN1STOP
```

Another aspect of the existing solution occurs when the UE tries to resume or setup a call from RRC_IDLE without context. If the previous step is performed, i.e., if the UE is configured to store idle measurements, the network may send a request to the UE after resume/setup (after security is activated) to ask whether the UE has idle measurements available.

In the case this UE is setting up a connection coming from RRC_IDLE without the Access Stratum (AS) Context, the network is not aware that the UE has available measurements stored. Then, to allow the network to know that the UE has available idle measurements stored, and possibly request the UE to report early measurements, the UE may indicate the availability of stored idle measurements in RRCConnectionSetupComplete. As not all cells would support the feature, the UE only includes this availability information if the cell broadcasts the idleModeMeasurements indication in system information block 2 (SIB2). The flag in RRCReconnectionSetupComplete is shown below:

```
RRCConnectionSetupComplete-v1530-IEs ::= SEQUENCE {
    logMeasAvailableBT-r15        ENUMERATED {true}               OPTIONAL,
    logMeasAvailableWLAN-r15      ENUMERATED {true}               OPTIONAL,
    idleMeasAvailable-r15         ENUMERATED {true}               OPTIONAL,
    flightPathInfoAvailable-r15   ENUMERATED {true}               OPTIONAL,
    connectTo5GC-r15              ENUMERATED {true}               OPTIONAL,
    registeredAMF-r15             RegisteredAMF-r15               OPTIONAL,
    s-NSSAI-list-r15              SEQUENCE(SIZE (1..maxNrofS-NSSAI-r15)) OF S-NSSAI-r15
OPTIONAL,
    ng-5G-S-TMSI-Bits-r15         CHOICE {
        ng-5G-S-TMSI-r15              NG-5G-S-TMSI-r15,
        ng-5G-S-TMSI-Part2-r15        BIT STRING (SIZE (8))
    }                                                             OPTIONAL,
    nonCriticalExtension          RRCConnectionSetupComplete-v1540-IEs  OPTIONAL
}
```

In the case this UE is setting up a connection coming from RRC_IDLE but with a stored AS Context (i.e., resume from suspended), the network may be aware that the UE may have available idle measurements stored after checking the fetched context from the source node where the UE got suspended. However, it is still not certain that the UE has measurements available since the UE is only required to perform the measurements if the cells are above the configured Reference Signal Received Power (RSRP)/Reference Signal Received Quality (RSRQ) thresholds and while the UE performs cell selection/cell reselection within the configured validity area. Then, to allow the network to know that the UE has stored idle mode measurements, and possibly request the UE to report early measurements, the UE may also indicate the availability of stored idle measurements in RRCConnectionResumeComplete. As not all cells would support this feature, the UE only includes this availability information if the cell broadcasts the idleModeMeasurements indication in SIB2. The flag in RRCReconnectionResumeComplete is shown below:

```
RRCConnectionResumeComplete-v1530-IEs ::= SEQUENCE {
    logMeasAvailableBT-r15        ENUMERATED       OPTIONAL,
                                  {true}
    logMeasAvailableWLAN-r15      ENUMERATED       OPTIONAL,
                                  {true}
    idleMeasAvailable-r15         ENUMERATED       OPTIONAL,
                                  {true}
    flightPathInfoAvailable-r15   ENUMERATED       OPTIONAL,
                                  {true}
```

-continued

```
    nonCriticalExtension          SEQUENCE { }     OPTIONAL
}
```

Once the UE indicates to the target cell upon resume or setup that idle measurements are available, the network may request the UE to report these available measurements by including the field idleModeMeasurementReq in the UEInformation Request message transmitted to the UE. Then, the UE responds with a UEInformationResponse containing these measurements.

[REPRODUCED AS FIG. 1]
UEInformationResponse message

```
-- ASN1START
UEInformationResponse-r9      ::=      SEQUENCE {
   rrc-TransactionIdentifier          RRC-TransactionIdentifier,
   criticalExtensions                 CHOICE {
      c1                              CHOICE {
         ueInformationResponse-r9         UEInformationResponse-r9-IEs,
         spare3 NULL, spare2 NULL, spare1 NULL
      },
      criticalExtensionsFuture       SEQUENCE { }
   }
}
UEInformationResponse-v1530-IEs ::= SEQUENCE {
   measResultListIdle-r15             MeasResultListIdle-r15      OPTIONAL,
   flightPathInfoReport-r15           FlightPathInfoReport-r15    OPTIONAL, nonCriticalExtension
}
```

Introducing Early Measurements Upon Idle/Inactive to Connected Transition in New Radio (NR) Release 16

A work item has been approved in Release 16 to enhance the setup of CA/DC in NR. The work item description (WID) "Enhancing CA Utilization" was approved in RAN #80 in RP-181469 and updated in RAN #81 in RP-182076. One of the objectives of this work item is the following:

Early Measurement reporting: Early and fast reporting of measurements information availability from neighbor and serving cells to reduce delay setting up MR-DC and/or CA. [RAN2, RAN4]

This objective applies to MR-DC, NR-NR DC and CA

The objective should consider measurements in IDLE, INACTIVE mode and CONNECTED mode The impacts on UE power consumption should be minimized The LTE Rel-15 euCA work should be utilized, when applicable Hence, 3GPP is going to investigate solutions to enable early measurements performed when the UE is in RRC_INACTIVE or RRC_IDLE state and reporting mechanisms for when the UE enters RRC_CONNECTED.

Three different kinds of solutions are being considered:

1. UE reports early measurements in UEInformationResponse after request from network in UEInformationRequest transmitted after the UE sends an RRCResumeComplete or after security is activated when UE comes from idle without stored context (as in LTE Release 15);
2. UE reports early measurements with (e.g., multiplexed with or as part of the message) RRCResumeComplete;
3. UE reports early measurements with (e.g., multiplexed with or as part of the message) RRCResumeRequest.

There are some differences in details of each of these solutions, and not all of them may be applicable for RRC_IDLE in the same way they are for RRC_INACTIVE. However, in any of these solutions for the reporting, the UE relies on a measurement configuration, which may be provided with dedicated signaling when the UE is suspended to RRC_INACTIVE or when the UE is released to RRC_IDLE. That measurement configuration indicates how the UE is to perform these measurements to be reported when the UE resumes in the case of coming from RRC_INACTIVE or when the UE sets up a connection in the case of coming from RRC_IDLE.

FIGS. 2 through 5 indicate the current agreements regarding the early measurement signaling in LTE/NR Release 16.

FIG. 2 illustrates early measurement reporting in LTE/NR IDLE mode in Release 16 during connection setup, option 1. FIG. 3 illustrates early measurement reporting in LTE/NR IDLE mode in Release 16 during connection setup, option 2. FIG. 4 illustrates early measurement reporting in LTE IDLE with suspended, LTE INACTIVE mode or NR INACTIVE mode in Release 16, option 1. FIG. 5 illustrates early measurement reporting in NR INACTIVE mode in Release 16, option 2. It is for future study (FFS) if this is applicable to LTE IDLE with suspended and LTE INACTIVE modes.

Early Measurement Configurations and Results in Release 16 LTE and IR

In RAN2 #105 bis meeting, it has been agreed:
Agreements
1: NR early measurements can be configured in both NR RRCRelease message and NR system information.
FFS: Whether there are differences in the configuration that can be provided by RRCRelease and SI.
2: Introduce some indication about the cell's early measurement support in NR system information.
3: To control the duration of UE performing both IDLE and INACTIVE measurements, a single validity timer (similar to measIdleDuration in LTE euCA) is mandatory indicated only in NR RRCRelease message, i.e. not included in NR SIB.
4: For both IDLE and INACTIVE early measurements, the following IEs can be optionally configured per NR frequency in both NR RRCRelease message and NR SIB:
A list of frequencies and optionally cells (similar to measCellList in LTE euCA) the UE is required to perform early measurements.
A cell quality threshold (similar to qualityThreshold in LTE euCA) the UE is required to report the measurement results only for the cells which met the configured thresholds.
FFS: A validity Area (similar to validityArea in LTE euCA) to indicate the list of cells within which UE is required to perform early measurements. If the UE reselects to a cell outside this list, the early measurements are no longer required (same as timer expiry). If it is absent, the UE will not have area limitation of early measurements.
For SSB Based Measurements:
5: For both IDLE and INACTIVE early measurements, SSB frequencies to be measured can be located out of sync raster 6: For both IDLE and INACTIVE early measurements, RSRP and RSRQ can be configured as cell and beam measurement quantity.

7: For both IDLE and INACTIVE early measurements, the configuration parameters provided per SSB frequency follow the same principles as those provided in SIB2/4 for the purposes of Idle/Inactive mobility. (Details differences can be discussed at stage 3 level)

8: As LTE euCA, cell/beam SINR is not introduced as measurement quantity in NR early measurement configuration in Rel-16.

For SSB Based Beam Level Measurement Configurations:

9: The UE is required to report the beam with the highest measurement quantity

FFS: Whether additional beams can be reported.

10: For both IDLE and INACTIVE early measurements, the UE can be configured with one of the 3 beam reporting types
 1) No beam reporting;
 2) Only beam identifier
 3) Both beam identifier and quantity FFS: Whether to support CSI-RS based NR early measurements 11: LTE UE in IDLE mode, IDLE with suspended, and INACTIVE can be configured with NR early measurements to support fast setup of (NG)EN-DC (i.e. euCA is extended to support NR measurements). Details are FFS.

That is, the rel-16 early measurement configurations and reporting will include NR measurements as well, in contrast to the LTE rel-15 early measurement configurations that contained only LTE measurements.

Furthermore, during RAN2 #106 it was agreed:

Agreements

1: The early measurement configuration can be different between that in RRCRelease and in SIB. If the UE receives the early measurement configuration from RRCRelease, this overrides the early measurement configuration provided in SIB (if any).

FFS: Whether some other measurement related configuration in SI (e.g. smtc) outside of the early measurement configuration can still be used.

2: A single early measurement configuration is provided in SI for idle and inactive FFS: Whether the early measurement configuration can be kept when the UE receives the Release (to Inactive to Idle) in response to Resume Request.

3: L3 filtering is not applied to early measurement reporting

4: The UE performs the idle measurement for the frequencies in configured frequency list only when the UE support CA or MR-DC between the frequency and the serving frequency.

FFS: Whether the network can provide information on support of CA/DC between frequencies to assist the UE to determine which frequencies to provide measurement for.

6: If UE reselects to a cell that does not support early measurements (as indicated by absence of an indicator in SI), the validity timer keeps running, but the UE is not required to performs measurements while camped on that cell (same as LTE euCA)

That is, the rel-16 early measurement configurations will be possible to provide in either dedicated or broadcasted signaling During RAN2 #107, it was agreed:

Agreements

1: For per-frequency SSB measurement configuration reuse the IE structure that is currently used in SIBs for cell reselection purposes.

2: The legacy SSB measurement configurations in NR SIB2/4 and LTE SIB24 are reused for NR early measurements performed in frequencies which are candidates of cell selection/reselection, i.e. not introduce new measurement configurations in NR/LTE SIB for these SSBs.

3: Same as LTE euCA, NR frequency list (not the SSB measurement configuration) can be different between RRC release and SIB. The frequency list, if provided, in RRC release message overrides the one provided in SIB.

4: For per frequency SSB measurement configuration for purpose of only early measurements, it can be included in both RRC release message and SIB. If provided in RRC release message, it overrides the one provided in SIB in the cell where the RRC Release message is received.

FFS How UE manages the situation when an SSB measurement configuration for a given frequency is provided in SIB of the current cell and was also provided RRC Release (in an earlier cell).

Agreements

7: As in LTE euCA, the indication whether to report RSRP, RSRQ or both can be indicated in both RRC release message and SIB. If provided in RRC release, it overrides the one in SIB.

8: Similar to LTE euCA, the indication of beam reporting type (i.e. whether to, not report beam results, report only the beam index, or report both beam index and results) can be indicated in both RRC release message and SIB. If provided in RRC release, it overrides the one in SIB.

9: NR early measurement configuration is included in a new NR SIB.

10: NR early measurement configuration is included in LTE SIB5 (i.e. the SIB including LTE early measurement configurations)

11: It is not necessary to specify CSI-RS based early measurements for the case of SCell with SSB in Rel-16.

12: It is not necessary to specify CSI-RS based early measurements for the case of SCell without SSB in Rel-16.

13: In NR early measurement configuration, the UE can be configured with maximum number for beam reporting and only beams above configured threshold for cell quality derivation are required to be reported (as NR CONNECTED measurements).

14: Do not support the network provide information on network's support of CA/DC between frequencies to assist the UE to determine which frequencies to provide NR early measurement in Rel-16.

15: Do not support a mechanism to prevent outdated early measurement reporting in Rel-16

SUMMARY

Systems and methods are disclosed herein for configuration of multi-Radio Access Technology (RAT) early measurements. In one embodiment, a method performed by a wireless communication device comprises receiving system information from a first cell of a first network node. The method further comprises receiving a dedicated release message from the first cell of the first network node, wherein the dedicated release message comprises idle mode measurement configurations for one or more carriers for a first RAT, idle mode measurement configurations for one or more carriers for a second RAT, or both idle mode measurement configurations for one or more carriers for the first RAT and idle mode measurement configurations for one or more carriers for the second RAT. The method further comprises determining idle mode measurement configurations to be applied by the wireless communication device while in the first cell based on the idle mode measurement configurations received on the first cell. The method further comprises applying the determined idle mode measurement configurations for idle mode measurements while in the first cell and performing idle mode measurements using the applied idle mode measurement configurations for idle mode measurements while in the first cell. The method further comprises performing a reselection to a second cell served by a second base station and receiving system information from the second cell of a second network node. The system information received from the second cell comprises idle mode measurement configurations for one or more carriers for the first RAT, idle mode measurement configurations for one or more carriers for the second RAT, or both idle mode measurement configurations for one or more carriers for the first RAT and idle mode measurement configurations for one or more carriers for the second RAT. The method further comprises determining idle mode measurement configurations to be applied by the wireless communication device while in the second cell based on the idle mode measurement configurations comprised in the dedicated release message received from the first cell and the idle mode measurement configurations comprised in the system information received from the second cell. The method further comprises applying the determined idle mode measurement configurations for idle mode measurements while in the second cell and performing idle mode measurements using the applied idle mode measurement configurations for idle mode measurements while in the second cell. In this manner, handling of idle mode measurements upon cell reselection is defined.

In one embodiment, determining the idle mode measurement configurations to be applied by the wireless communication device while in the first cell comprises, for each RAT from among a first RAT and a second RAT, determining whether the dedicated release message from the first cell comprises an idle mode measurement configuration for one or more carriers of the RAT and, upon determining that the dedicated release message from the first cell comprises an idle mode measurement configuration for one or more carriers of the RAT, applying the idle mode measurement configuration for the one or more carriers of the RAT comprised in the dedicated release message from the first cell. In one embodiment, the method further comprises, for each RAT from among the first RAT and the second RAT, performing actions upon determining that the dedicated release message from the first cell does not comprise an idle mode measurement configuration for one or more carriers of the RAT. These actions comprise determining whether the system information from the first cell comprises an idle mode measurement configuration for one or more carriers of the RAT and, upon determining that the system information from the first cell comprises an idle mode measurement configuration for one or more carriers of the RAT, applying the idle mode measurement configuration for the one or more carriers of the RAT comprised in the system information from the first cell.

In one embodiment, the method further comprises reporting results of the performed idle mode measurements to a network node upon resuming or establishing a connection with the network node.

In one embodiment, determining idle mode measurement configurations to be applied by the wireless communication device while in the second cell comprises, for each RAT from among the first RAT and the second RAT, determining whether the system information received from the second cell comprises idle mode measurement configurations for one or more carriers of the RAT, determining whether the dedicated release message received from the first cell comprises idle mode measurement configurations for one or more carriers of the RAT. For each RAT from among the first RAT and the second RAT, determining idle mode measurement configurations to be applied by the wireless communication device while in the second cell further comprises, upon determining that the system information received from the second cell comprises idle mode measurement configurations for one or more carriers of the RAT and determining that the dedicated release message received from the first cell does comprise idle mode measurement configurations for one or more carriers of the RAT, continuing to perform idle mode measurements in accordance with the idle mode measurement configurations for one or more carriers of the RAT comprised in the dedicated release message received from the first cell. In one embodiment, determining idle mode measurement configurations to be applied by the wireless communication device while in the second cell further comprises for each RAT from among the first RAT and the second RAT, upon determining that the system information received from the second cell comprises idle mode measurement configurations for one or more carriers of the RAT and determining that the dedicated release message received from the first cell does not comprise idle mode measurement configurations for one or more carriers of the RAT, applying the idle mode measurement configurations for one or more carriers of the RAT comprised in the system information received from the second cell.

In one embodiment, the first cell is of the first RAT, the dedicated release message from the first cell comprises idle mode measurement configurations for one or more carriers for the first RAT, and the second cell does not support idle mode measurements for the first RAT. The method further comprises, upon reselecting to the second cell for the second RAT, releasing the idle mode measurement configurations for the one or more carriers for the first RAT and storing the idle mode measurement configurations for the one or more carriers for the first RAT. In one embodiment, the method further comprises applying the stored idle mode measurement configurations for the one or more carriers for the first RAT upon reselecting to a cell that supports idle mode measurement configurations for the first RAT.

In one embodiment, the first RAT is Evolved Universal Terrestrial Radio Access (E-UTRA), and the second RAT is New Radio (NR). In another embodiment, the first RAT is NR, and the second RAT is E-UTRA.

In one embodiment, the received release message comprises one of an RRCRelease message or an RRCConnectionRelease message.

In one embodiment, the received system information is comprised in a System Information Block (SIB) message, wherein the SIB message comprises one of a SIB2 message, a SIB4 message, a SIB10 message, and a SIB24 message.

Corresponding embodiments of a wireless communication device are also disclosed. In one embodiment, a wireless communication device is adapted to receive system information from a first cell of a first network node. The wireless communication device is further adapted to receive a dedicated release message from the first cell of the first network node, wherein the dedicated release message comprises idle mode measurement configurations for one or more carriers for a first RAT, idle mode measurement configurations for one or more carriers for a second RAT, or both idle mode measurement configurations for one or more carriers for the first RAT and idle mode measurement configurations for one or more carriers for the second RAT. The wireless communication device is further adapted to determine idle mode measurement configurations to be applied by the wireless communication device while in the first cell based on the idle mode measurement configurations received on the first cell. The wireless communication device is further adapted to apply the determined idle mode measurement configurations for idle mode measurements while in the first cell and perform idle mode measurements using the applied idle mode measurement configurations for idle mode measurements while in the first cell. The wireless communication device is further adapted to perform a reselection to a second cell served by a second base station and receive system information from the second cell of a second network node. The system information received from the second cell comprises idle mode measurement configurations for one or more carriers for the first RAT, idle mode measurement configurations for one or more carriers for the second RAT, or both idle mode measurement configurations for one or more carriers for the first RAT and idle mode measurement configurations for one or more carriers for the second RAT. The wireless communication device is further adapted to determine idle mode measurement configurations to be applied by the wireless communication device while in the second cell based on the idle mode measurement configurations comprised in the dedicated release message received from the first cell and the idle mode measurement configurations comprised in the system information received from the second cell. The wireless communication device is further adapted to apply the determined idle mode measurement configurations for idle mode measurements while in the second cell and perform idle mode measurements using the applied idle mode measurement configurations for idle mode measurements while in the second cell.

In one embodiment, a wireless communication device comprises one or more transmitters, one or more receivers, and processing circuitry configured to cause the wireless communication device to receive system information from a first cell of a first network node. The processing circuitry is further configured to cause the wireless communication device to receive a dedicated release message from the first cell of the first network node, wherein the dedicated release message comprises idle mode measurement configurations for one or more carriers for a first RAT, idle mode measurement configurations for one or more carriers for a second RAT, or both idle mode measurement configurations for one or more carriers for the first RAT and idle mode measurement configurations for one or more carriers for the second RAT. The processing circuitry is further configured to cause the wireless communication device to determine idle mode measurement configurations to be applied by the wireless communication device while in the first cell based on the idle mode measurement configurations received on the first cell. The processing circuitry is further configured to cause the wireless communication device to apply the determined idle mode measurement configurations for idle mode measurements while in the first cell and perform idle mode measurements using the applied idle mode measurement configurations for idle mode measurements while in the first cell. The processing circuitry is further configured to cause the wireless communication device to perform a reselection to a second cell served by a second base station and receive system information from the second cell of a second network node. The system information received from the second cell comprises idle mode measurement configurations for one or more carriers for the first RAT, idle mode measurement configurations for one or more carriers for the second RAT, or both idle mode measurement configurations for one or more carriers for the first RAT and idle mode measurement configurations for one or more carriers for the second RAT. The processing circuitry is further configured to cause the wireless communication device to determine idle mode measurement configurations to be applied by the wireless communication device while in the second cell based on the idle mode measurement configurations comprised in the dedicated release message received from the first cell and the idle mode measurement configurations comprised in the system information received from the second cell. The processing circuitry is further configured to cause the wireless communication device to apply the determined idle mode measurement configurations for idle mode measurements while in the second cell and perform idle mode measurements using the applied idle mode measurement configurations for idle mode measurements while in the second cell.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 17 through 20 are flow charts that illustrate example embodiments of methods implemented in a communication system such as that of FIG. 15.

DETAILED DESCRIPTION

Figure 1:
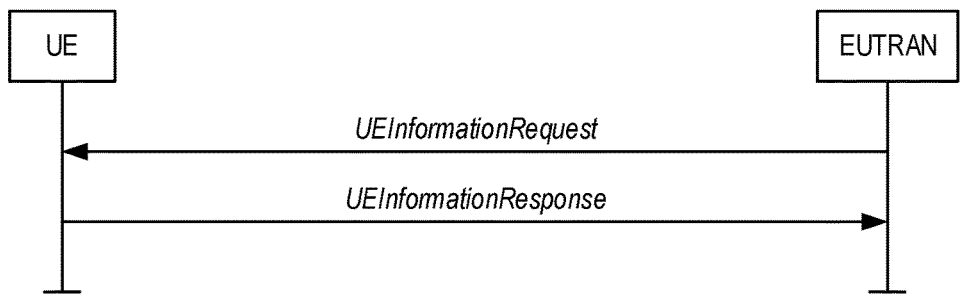
FIG. 1 is a reproduction of FIG. 5.6.6.1-1 from Third Generation Partnership Project (3GPP) Technical Specification (TS) 36.331 section 5.6.20 showing the User Equipment (UE) information procedure.
Figure 2:
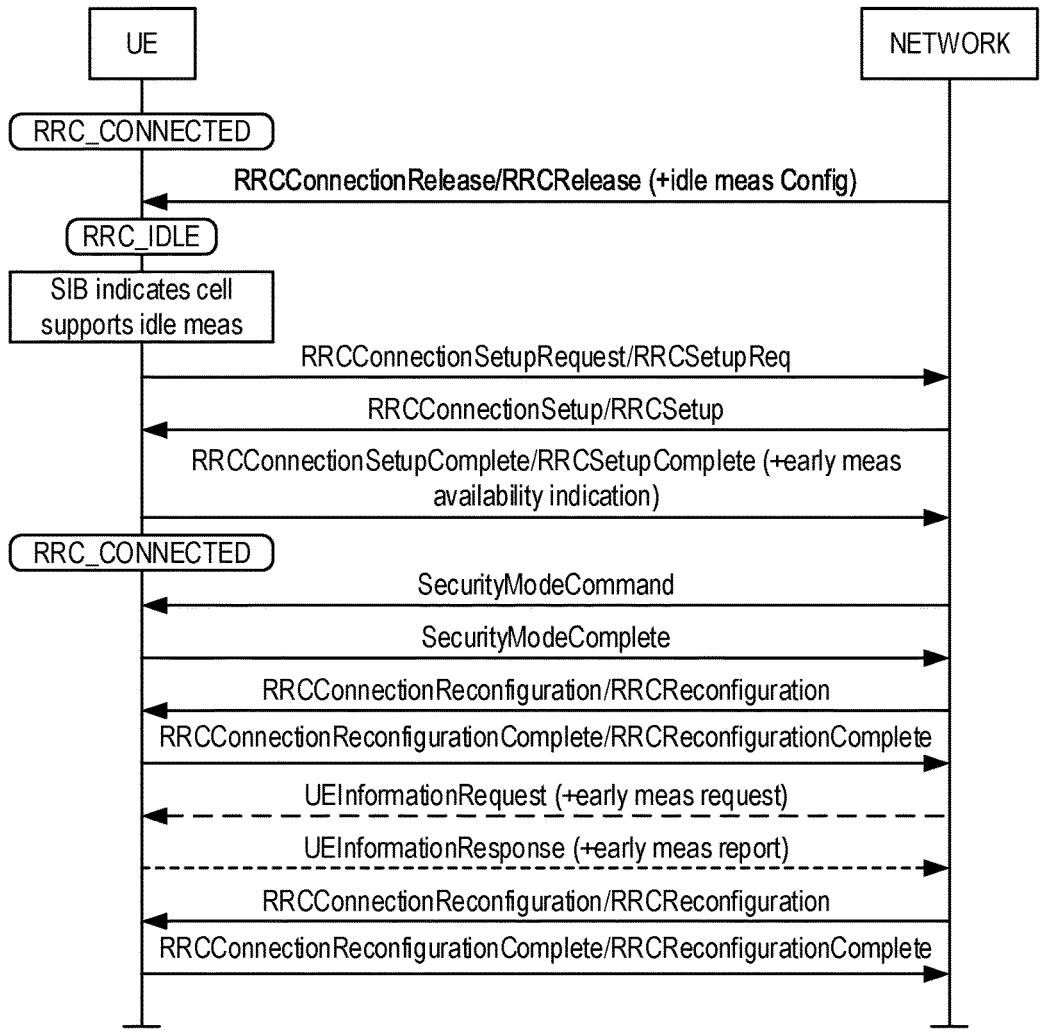
FIGS. 2 through 5 indicate the current agreements regarding early measurement signaling in Long Term Evolution (LTE)/New Radio (NR) IDLE mode in Release 16.
Figure 3:
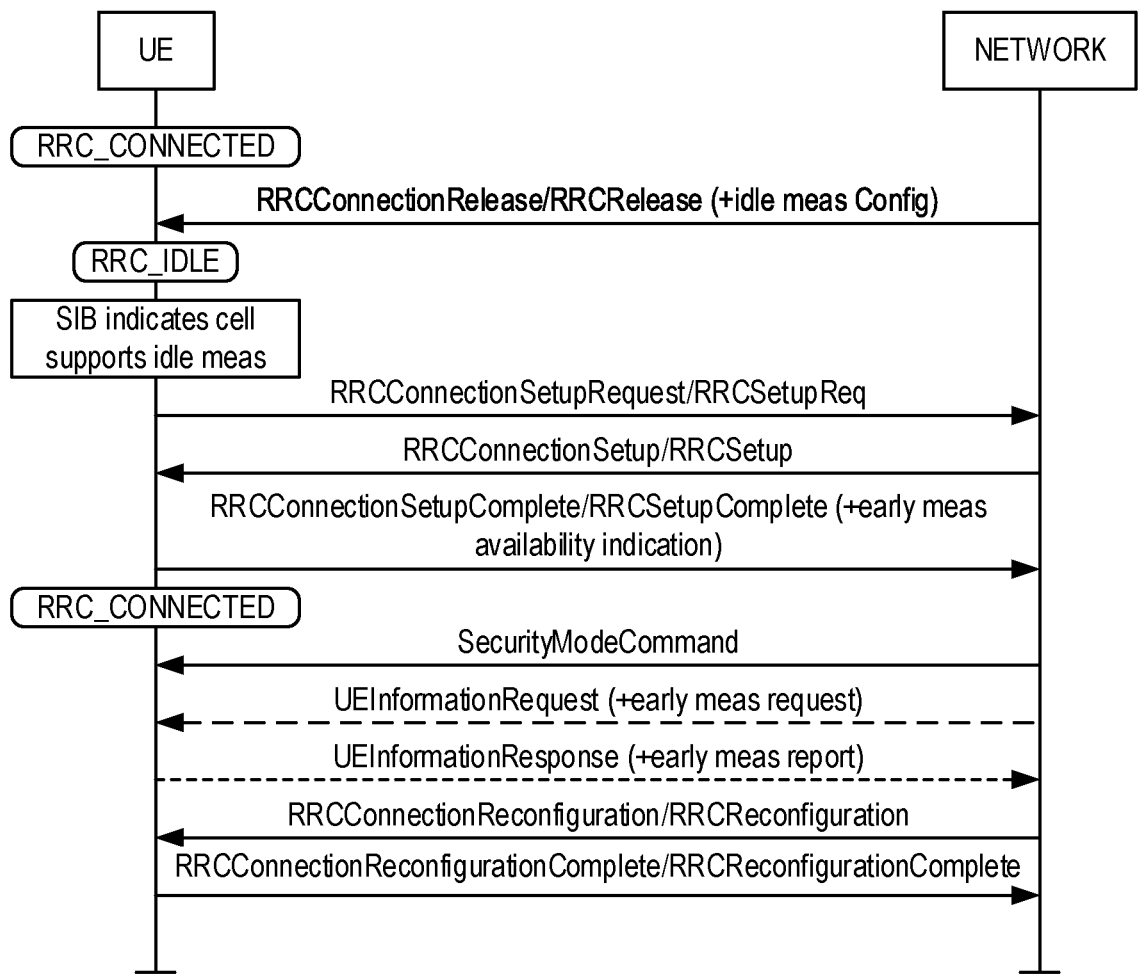
Figure 4:
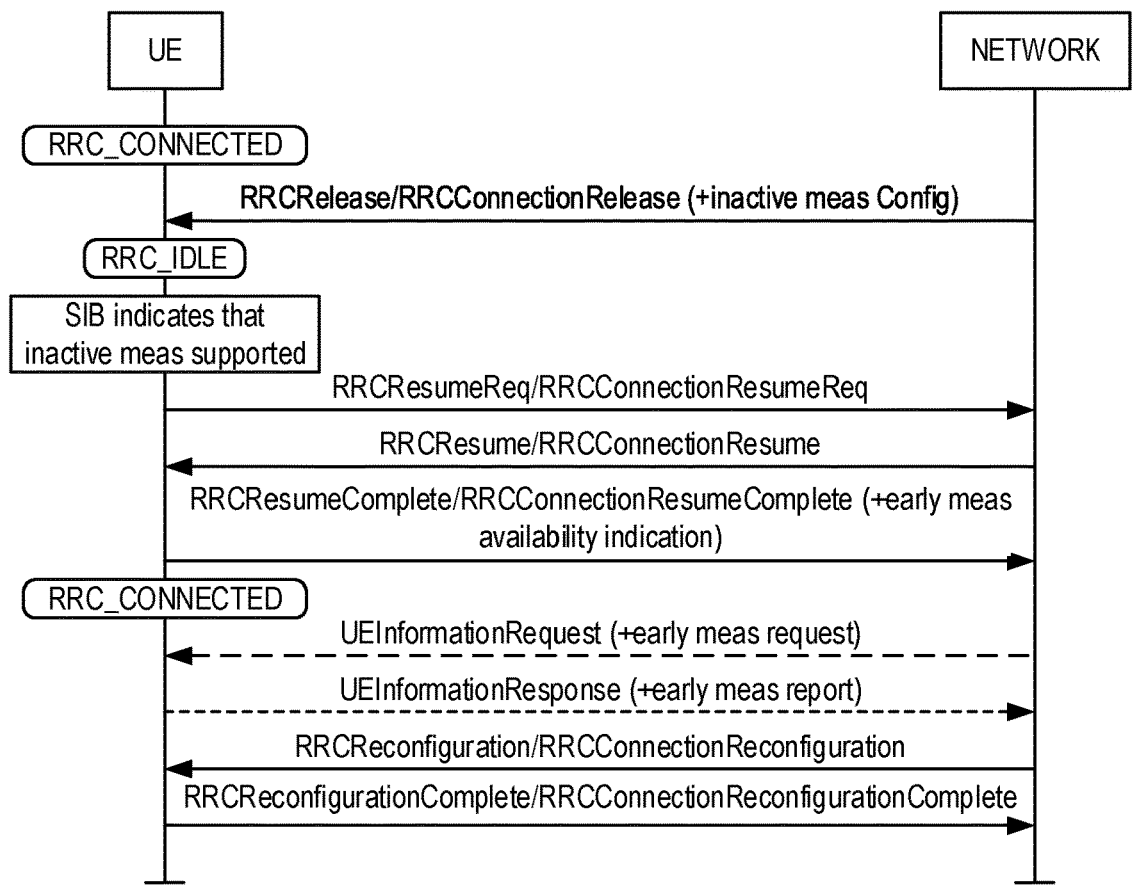
Figure 5:
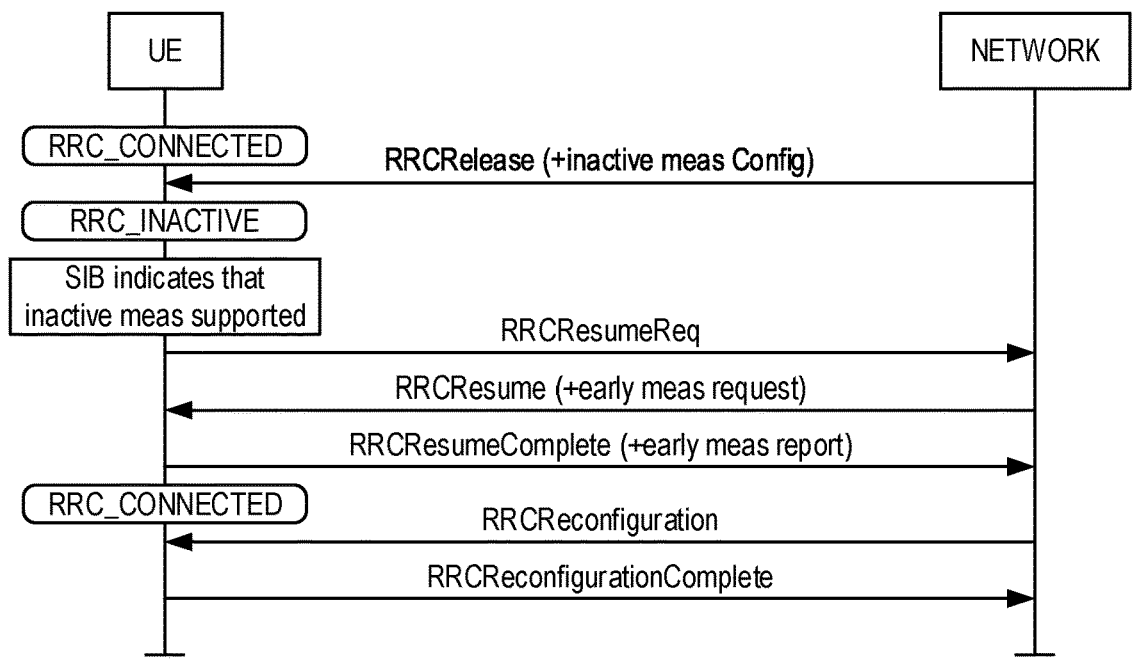

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In LTE Release 15, if a UE receives an RRCConnectionRelease message that only contains the measIdleDuration, the UE will perform idle mode measurements according to the broadcasted measurement configurations in system information block 2 (SIB2). Note that while referred to herein as broadcasted information, the SIB2 containing idle mode measurement configurations may alternatively be sent to the UE via dedicated signaling (e.g., RRC signaling), as will be appreciated by those of skill in the art. If the UE then reselects to another cell, it will update the measurement configurations with the broadcasted information in the new cell. On the other hand, if a UE receives an RRCConnectionRelease message that contains a measIdleConfigDedicatedwith measurement configurations (e.g., carriers, bandwidth, cells to measure, and reporting quantities and thresholds), the UE will perform idle mode measurements according to these configurations. If the UE then re-selects to another cell, the UE will continue to perform idle mode measurements according to the previous dedicated configurations.

In Release 16, idle mode measurements for both LTE and NR have been introduced. However, if a UE is configured with dedicated signaling to perform idle mode measurements by a Release 15 eNB, this will by necessity only contain configurations for LTE carriers. If the UE reselects to a Release 16 eNB or a gNB, which also supports configuring NR carriers for idle mode measurements, the UE will continue to only measure on LTE carriers. If the UE was instead configured to apply the broadcasted configurations in the Release 15 eNB (i.e., only measIdleDuration was provided via RRCRelease), when the UE re-selects to a Release 16 eNB or gNB, it will check the target broadcasted information and, if it contains NR configurations for idle mode measurements, it is not clear from the current 3GPP agreements if the UE will start performing idle mode measurements also on the NR carriers.

In general, if a UE is configured in a source node to only perform idle mode measurements on one Radio Access Technology (RAT), e.g., because the source node does not support Multi-RAT Dual Connectivity (MR-DC), and the UE then re-selects to another cell in another node (e.g., which does support MR-DC), if the UE was configured with dedicated signaling, the UE would not be able to measure the inter-RAT carriers after the re-selection. However, if the UE was configured with broadcasted signaling, it is currently not clear if the UE would start performing measurements on the other RAT based on the new early measurement configurations from the new cell.

In essence, the problem is that if the UE is provided with early measurement configurations pertaining to a single RAT (e.g., LTE) when released and the UE reselects to a cell which supports multi-RAT early measurements and is broadcasting multi-RAT early measurement configuration (e.g., LTE and NR), the UE will not be able to measure on these inter-RAT carriers/cells.

Certain aspects of the present disclosure and their embodiments may provide solutions to the aforementioned or other challenges. Systems and methods are disclosed herein for handling early measurement configurations when a wireless communication device (e.g., a UE) moves from one base station that uses a first RAT that does not support MR-DC (e.g., a Release 15 eNB) to another base station that uses a second RAT that does support MR-DC (e.g., a Release 16 eNB), or vice versa.

In some embodiments of the present disclosure, mechanisms to handle early measurement configurations for LTE and NR are provided. In some embodiments, the method comprises using independent handling for LTE and NR configurations. That way, the network is able to configure the LTE and NR measurement configurations independently. For example, the network can configure the UE with dedicated measurement configurations for LTE and instruct the UE to apply broadcasted configurations for NR, or vice versa. The configuration for both can be received via broadcast, or another possibility is to have them both via dedicated.

If a Release 16 UE is released while being served by a Release 15 eNB, the UE will receive configurations to measure only on LTE frequencies. If the UE later re-selects to a Release 16 eNB that is capable of configuring NR idle mode measurements, the UE obtains the NR measurement configuration from the broadcasted information and performs idle mode measurements on NR carriers based on the NR measurement configuration, while continuing to perform the LTE measurements based on the configurations received in the source cell.

If a UE is configured with only NR early measurement configurations in an NR node (gNB) that does not support MR-DC and then re-selects to another cell in another NR node that does support MR-DC, the UE obtains the LTE early measurement configurations from the broadcasted information in the target cell and performs idle mode measurements on LTE based on the LTE early measurement configurations, while continuing to perform the early measurement configurations for the NR carriers based on the configurations received in the source cell.

If a Release 16 UE is released while being served by a Release 16 eNB, the UE will receive configurations to measure on both LTE and NR frequencies. If the UE later re-selects to a Release 15 eNB capable of configuring only LTE idle mode measurements, the UE updates the NR measurement configurations in one of the following ways:
  releases all stored NR measurement configurations,
  releases the stored NR measurement configuration that was received via broadcast in the cell where it was released, or
  keeps the stored NR measurement configuration.
In case the NR measurement configurations are released, the UE also stops performing the NR measurements. However, if the NR measurement configurations (or part of it) is kept, the UE can either continue to perform the NR measurements based on the updated NR measurement configurations or the UE stops/pauses performing the NR measurements while in that cell (e.g., so that it can resume the NR measurements if it re-selects again to a cell that support NR idle mode measurements). Which of the above behavior to apply to the NR measurement configuration and the performing of the measurements can be configured by the network, based on UE implementation, or specified in 3GPP standards.

If a Release 16 UE is released while being served by a Release 16 gNB that is capable of MR-DC, it will receive configurations to measure on both LTE and NR frequencies. If the UE later re-selects to a Rel-16 gNB that is not capable of MR-DC, the UE updates the LTE measurement configurations in one of the following ways:
  releases all stored LTE idle mode measurement configurations,
  releases the stored LTE measurement configuration that was received via broadcast in the cell where it was released, or
  keeps the stored LTE measurement configuration.
In case the LTE measurement configurations are released, the UE also stops performing the LTE measurements. However, if the LTE measurement configurations (or part of it) is kept, the UE can either continue to perform the LTE measurements based on the updated LTE measurement configurations or the UE stops/pauses performing the LTE measurements while in that cell (e.g., so that it can resume the LTE measurements if it re-selects again to a gNB/cell that supports MR-DC).

Certain embodiments may provide one or more of the following technical advantage(s). The solution enables independent handling of the LTE and NR idle mode measurement configurations, so that if a UE is configured with dedicated signaling to perform early measurements on only a single RAT in one cell, and the UE re-selects to another cell (which broadcasts configurations for other RATs), the UE can obtain the idle mode measurement configurations for the other RAT and perform idle mode measurements relevant for the new cell for faster CA/DC setup.

Figure 6:
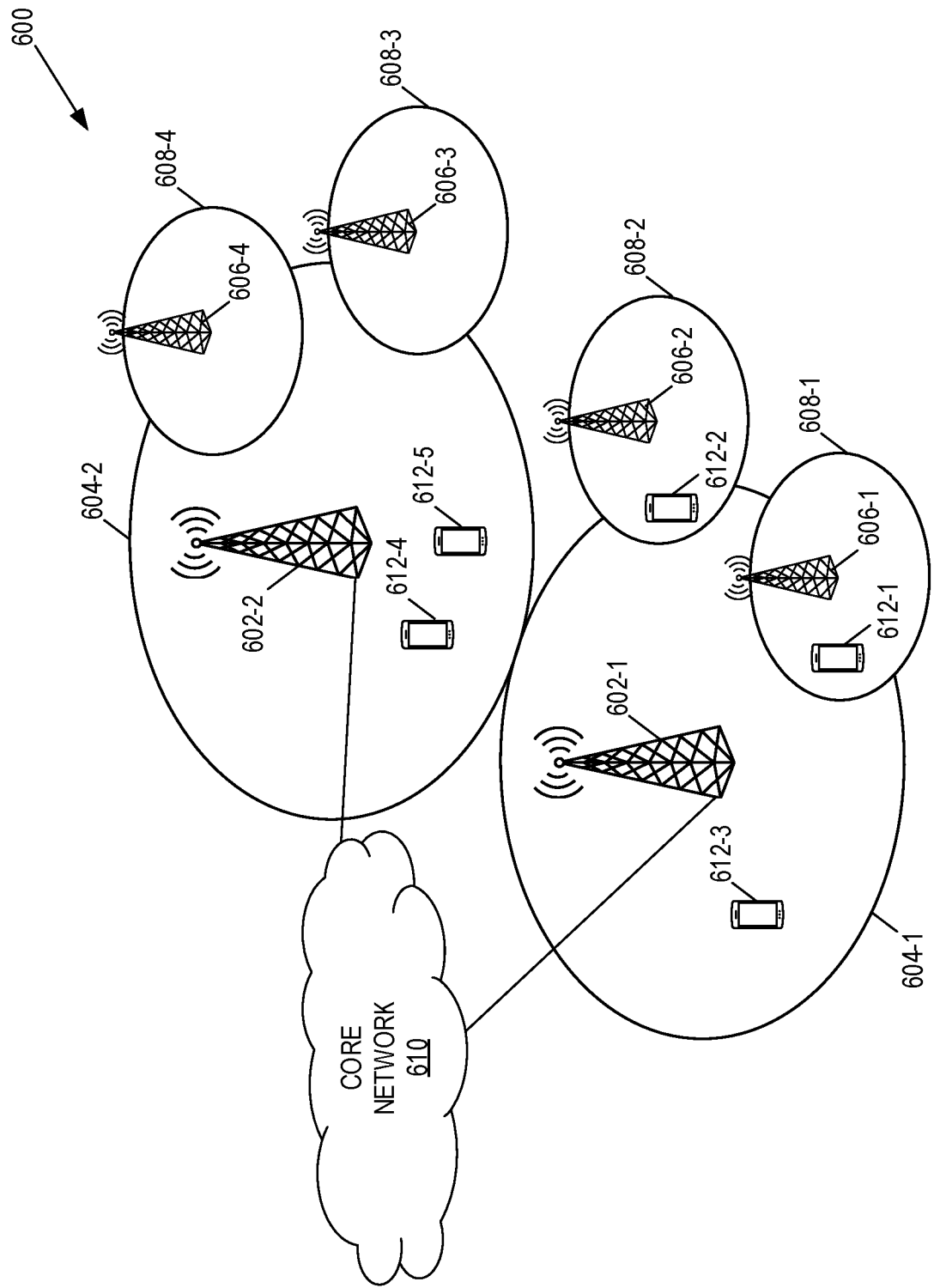
FIG. 6 illustrates one example of a cellular communications system in which embodiments of the present disclosure may be implemented.

In this regard, FIG. 6 illustrates one example of a cellular communications system 600 in which embodiments of the present disclosure may be implemented. In the embodiments described herein, the cellular communications system 600 includes a Radio Access Network (RAN) that includes base stations of different RATs (e.g., a first RAT that does not support MR-DC and a second RAT that does support MR-DC). For example, the RAN may include both Rel-15 eNBs and Rel-16 eNBs. In this example, the RAN includes base stations 602-1 and 602-2. For example, the base station 602-1 may be for a first RAT that does not support MR-DC (e.g., a Rel-15 eNB), and base station 602-2 may be for a second RAT that does support MR-DC (e.g., Rel-16 eNB). The base stations 602-1 and 602-2 serve corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which may be, for example, an EPC or 5GC. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

Now, a description of some example embodiments of the present disclosure is provided. Note that most of the description below refers to LTE messages and procedures. However, the methods described herein are also applicable to future releases of NR (e.g., Rel-17), if further enhancements of the early measurement reporting are implemented that create some incompatibility between the Rel-16 and Rel-17 measurement configurations/results.

In the embodiments descried below, it is assumed that the RRC release message was the LTE RRC connection release message that was received from the LTE node where the cell was released. However, it is also possible to envision the case where the UE is released in NR (i.e., RRCRelease message), performs inter-RAT reselection to an LTE cell, and keeps on performing the early measurements according to the configurations received in RRCRelease and the configurations received in the current LTE cell or, vice versa, where the UE gets released in LTE and performs inter-RAT cell reselection towards an NR cell, and keeps performing early measurements based on the dedicated configurations received in LTE and the broadcast information in NR.

In the embodiments below, by "measurement configuration," it is meant the list of frequencies that the UE has to measure while in IDLE/INACTIVE mode and optionally additional information that the UE needs to measure on those frequencies (e.g., SSB configuration, information on which cells to measure at each frequency, reporting thresholds, etc.)

The following embodiments provide mechanisms to independently configure and handle early measurement configurations for LTE and NR.

In one embodiment of the present disclosure, early measurement configurations for LTE and NR are handled separately, e.g., the network can provide dedicated configurations for one of them and broadcasted configurations for the other. For instance, if a Rel-16 UE is being released by a Rel-15 eNB, the Rel-16 UE will only receive configurations to measure on LTE cell via dedicated signaling. If the UE later re-selects to a Rel-16 eNB that is capable of configuring NR idle mode measurements, the UE will obtain the NR measurement configuration from the broadcasted information and perform idle mode measurements on NR carriers using these configurations, while continuing to perform the LTE measurements based on the stored configurations (i.e., that were received in the source cell where it was released).

The current draft specification for the early measurement configurations is captured in the RRC running CR is (R2-1914189) with the underlined/bolded text as proposed introductions to LTE Release 15:

| MeasIdleConfig information element |
|---|
| ```
-- ASN1START
MeasIdleConfigSIB-r15 ::= SEQUENCE {
    measIdleCarrierListEUTRA-r15        EUTRA-CarrierList-r15,
    ...,
    [[
    measIdleCarrierListNR-r16           NR-CarrierList-r16          OPTIONAL,  -- Need OR
    ]]
}
MeasIdleConfigDedicated-r15 ::= SEQUENCE {
    measIdleCarrierListEUTRA-r15        EUTRA-CarrierList-r15       OPTIONAL,  -- Need OR
    measIdleDuration-r15                ENUMERATED {sec10, sec30, sec60, sec120,
                                                   sec180, sec240, sec300, spare},
    ...,
    [[
    measIdleCarrierListNR-r16           NR-CarrierList-r16          OPTIONAL,  -- Need OR
    ]]
}
EUTRA-CarrierList-r15 ::= SEQUENCE (SIZE (1..maxFreqIdle-r15)) OF MeasIdleCarrierEUTRA-r15
``` |

| MeasIdleConfig information element |
|---|

```
NR-CarrierList-r16 ::= SEQUENCE (SIZE (1..FFS)) OF MeasIdleCarrierNR-r16
MeasIdleCarrierEUTRA-r15::=       SEQUENCE {
   carrierFreq-r15                    ARFCN-ValueEUTRA-r9,
   allowedMeasBandwidth-r15           AllowedMeasBandwidth,
   validityArea-r15                   CellList-r15                    OPTIONAL,  -- Need OR
   measCellList-r15                   CellList-r15                    OPTIONAL,  -- Need OR
   reportQuantities                   ENUMERATED {rsrp, rsrq, both},
   qualityThreshold-r15               SEQUENCE {
      idleRSRP-Threshold-r15             RSRP-Range                      OPTIONAL,  -- Need
OR
      idleRSRQ-Threshold-r15             RSRQ-Range-r13                  OPTIONAL   -- Need
OR
   }                                                                  OPTIONAL,  -- Need OP
   ...
}
MeasIdleCarrierNR-r16 ::=         SEQUENCE {
   carrierFreqNR-r16                  ARFCN-ValueNR-r15,
   measCellListNR-r16                 CellList-NR-r16                 OPTIONAL,  -- Need FFS
   reportQuantitiesNR-r16             ENUMERATED {rsrp, rsrq, both},
   qualityThresholdNR-r16             SEQUENCE {
      idleRSRP-ThresholdNR-r16           RSRP-RangeNR-r15                OPTIONAL,  -- Need FFS
      idleRSRQ-ThresholdNR-r16           RSRQ-RangeNR-r15                OPTIONAL   -- Need FFS
   }                                                                  OPTIONAL,  -- Need FFS
   ssbMeasConfig-r16                  SEQUENCE {
      frequencyBandList                  MultiFrequencyBandListNR        OPTIONAL,
      maxRS-IndexCellQual-r16            MaxRS-IndexCellQualNR-r15                  OPTIONAL,
-- Need FFS
      threshRS-Index-r16                 ThresholdListNR-r15
OPTIONAL,                         -- Need FFS
      measTimingConfig-r16               MTC-SSB-NR-r15
OPTIONAL,                         -- Need FFS
      ssbSubcarrierSpacinq-r16           ENUMERATED (kHz15, kHz30, kHz120, kHz240},
      ssb-ToMeasure-r16                  SSB-ToMeasure-r15
OPTIONAL,                         -- Need FFS
      deriveSSB-IndexFromCell-r16        BOOLEAN,
      ss-RSSI-Measurement-r16            SS-RSSI-Measurement-r15
OPTIONAL                          -- Need FFS
   }                                                                  OPTIONAL   -- Cond FFS
   beamMeasConfigIdle-r16             BeamMeasConfigIdle-NR-r16                  OPTIONAL, --
Need FFS
   ...
}
CellList-r15 ::=                  SEQUENCE (SIZE (1.. maxCellMeasIdle-r15)) OF PhysCellIdRange
CellList-NR-r16 ::=               SEQUENCE (SIZE (1.. FFS)) OF PhysCellIdNR-r15
BeamMeasConfigIdle-NR-r16 ::=     SEQUENCE {
   reportQuantityRS-IndexNR-r16       ENUMERATED {rsrp, rsrq, both} OPTIONAL,  -- Need FFS
   maxReportRS-Index-r16              INTEGER (0..FFS)              OPTIONAL,  -- Need FFS
   reportRS-IndexResultsNR-r16           BOOLEAN
}
-- ASN1STOP
```

Based on this proposed message structure, the UE procedures could be implemented in LTE as e.g.:

5.3.8.3 Reception of the RRCConnectionRelease by the UE
The UE shall:
    <<skipped parts>>
    1> if the RRCConnectionRelease message includes the measIdleConfig:
        2> clear VarMeasIdleConfig and VarMeasIdleReport;
        2> store the received measIdleDuration in VarMeasIdleConfig;
        2> start T331 with the value of measIdleDuration;
        2> if the measIdleConfig contains measIdleCarrierListEUTRA:
            3> store the received measIdleCarrierListEUTRA in VarMeasIdleConfig;
            3> start performing idle mode measurements as specified in 5.6.20;
        2> if the measIdleConfig contains measIdleCarrierListNR:
            3> store the received measIdleCarrierListNR in VarMeasIdleConfig;
            3> start performing idle mode measurements as specified in 5.6.20;
    NOTE 2: If the measIdleConfig does not contain measIdleCarrierListEUTRA, UE may receive measIdleCarrierListEUTRA as specified in 5.2.2.12.
    NOTE 3: If the measIdleConfig does not contain measIdleCarrierListNR, UE may receive measIdleCarrierListNR as specified in 5.2.2.12.
5.2.2.12 Actions upon reception of SystemInformationBlockType5
Upon receiving SystemInformationBlockType5, the UE shall:
    <<skipped parts>>
    1> if in RRC_IDLE and UE has stored VarMeasIdleConfig_and SIB5 includes the measIdleConfigSIB
        and the UE is capable of IDLE mode measurements for CA:
        2> if T331 is running and VarMeasIdleConfig does not contain measIdleCarrierListEUTRA received
            from the RRCConnectionRelease message:
            3> store or replace the measIdleCarrierListEUTRA of measIdleConfigSIB within
                VarMeasIdleConfig;
        2> if T331 is running and VarMeasIdleConfig does not contain measIdleCarrierListNR
            received from the RRCConnectionRelease message:

```
    3> store or replace the measIdleCarrierListNR of
      measIdleConfigSIB within
        VarMeasIdleConfig;
  2> perform idle mode measurements as specified in 5.6.20;
```

In the above, it was assumed that the current handling in rel-15 is kept when it comes to receiving a SIB that doesn't include the measIdleCarrierListEUTRA inside measIdleConfigSIB (i.e., UE doesn't do anything and keeps performing measurements using stored configuration). Below is another realization where the UE, upon determining that the measIdleConfigSIB does not contain the measIdleCarrierListEUTRA, will release the stored measurement configuration for E-UTRA that were received via broadcast, if any (and a similar handling done for the case of NR measurements).

```
5.2.2.12 Actions upon reception of SystemInformationBlockType5
Upon receiving SystemInformationBlockType5, the UE shall:
        <<skipped parts>>
  1> if in RRC_IDLE and UE has stored VarMeasIdleConfig_and SIB5
  includes the measIdleConfigSIB
    and the UE is capable of IDLE mode measurements for CA:
    2> if T331 is running and VarMeasIdleConfig does not contain
    measIdleCarrierListEUTRA received
      from the RRCConnectionRelease message:
      3> if the measIdleCarrierListEUTRA is included in the
      measIdleConfigSIB:
        4> store or replace the measIdleCarrierListEUTRA of
          measIdleConfigSIB within
            VarMeasIdleConfig;
      3> else:
        4> release the measIdleCarrierListEUTRA from the
          VarMeasIdleConfig, if stored;
    2> if T331 is running and VarMeasIdleConfig does not contain
    measIdleCarrierListNR
      received from the RRCConnectionRelease message:
      3> if the measIdleCarrierListNR is included in the
      measIdleConfigSIB:
        4> store or replace the measIdleCarrierListNR of
          measIdleConfigSIB within
            VarMeasIdleConfig;
      3> else:
        4> release the measIdleCarrierListNR from the
          VarMeasIdleConfig, if stored;
    2> perform idle mode measurements as specified in 5.6.20;
```

In rel-15 euCA, if the SIB5 does not contain the measIdleConfigSIB, it is not clear on how the UE handles the idle mode configuration it has stored. Below is a realization of an embodiment where the UE releases the stored configurations that were received via broadcast in such cases.

```
1> if in RRC_IDLE and UE has stored VarMeasIdleConfig_and SIB5
includes the measIdleConfigSIB
  and the UE is capable of IDLE mode measurements for CA:
  ....<<skipped>>
1> else (i.e. measIdleConfigSIB not included)
  2> if T331 is running and VarMeasIdleConfig does not contain
  measIdleCarrierListEUTRA
    received from the RRCConnectionRelease message:
    3> release the measIdleCarrierListEUTRA from the
      VarMeasIdleConfig, if stored;
  2> if T331 is running and VarMeasIdleConfig does not contain
  measIdleCarrierListNR
    received from the RRCConnectionRelease message:
    3> release the measIdleCarrierListNR from the VarMeasIdleConfig,
      if stored;
```

Figure 7:
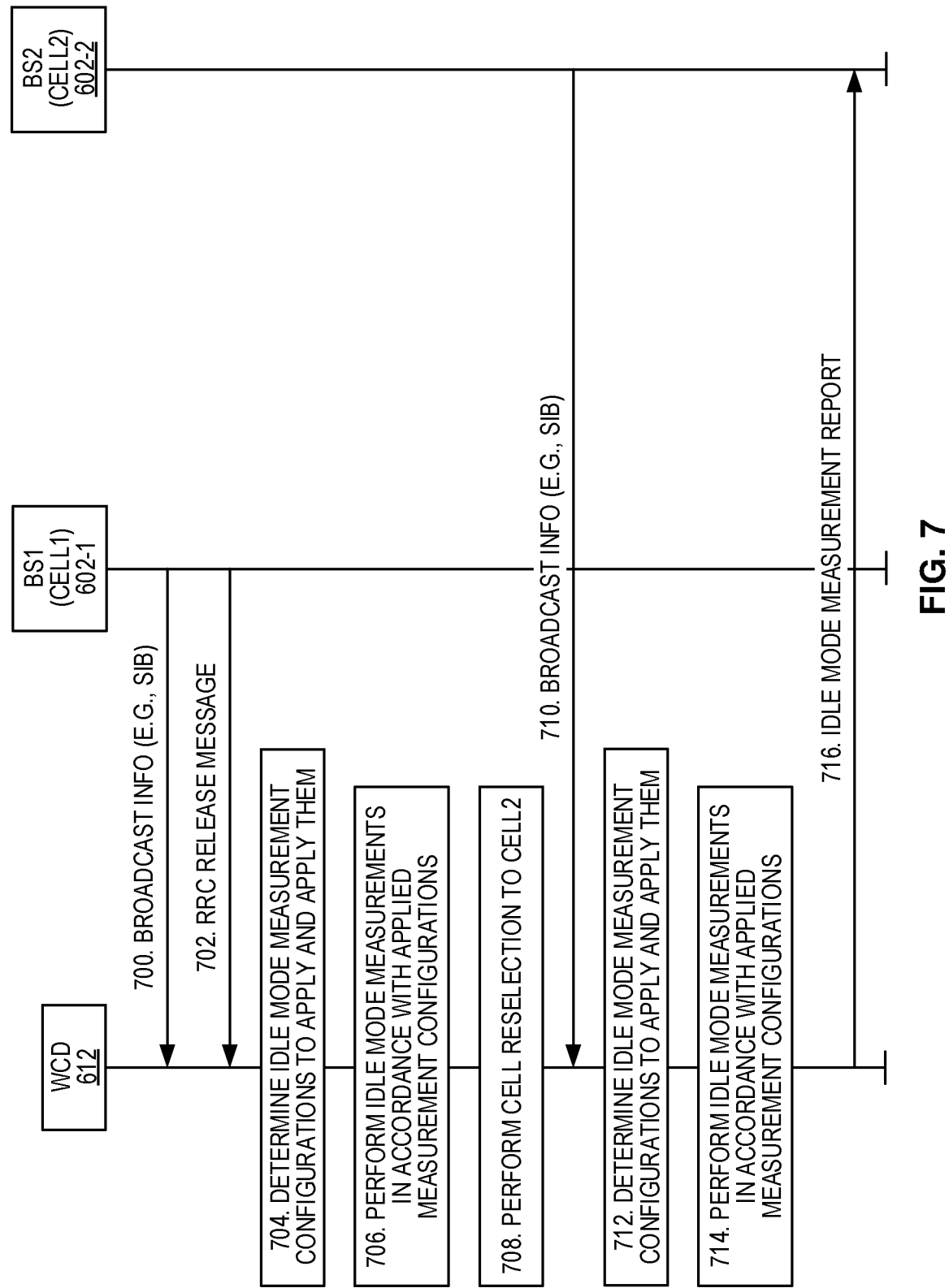
FIG. 7 illustrates the operation of a wireless communication device (WCD) and base stations for configuring and handling idle mode measurement configurations for multiple Radio Access Technologies (RATs) in accordance with at least some aspects of embodiments of the present disclosure.

FIG. 7 illustrates the operation of a wireless communication device (WCD) 612 and base stations 602-1 and 602-2 for configuring and handling idle mode measurement configurations for multiple RATs in accordance with at least some aspects of the embodiments described above. In this example, base station 602-1 (denoted BS1) serves a first cell (Cell1) that operates in accordance with a first RAT (RAT1), and base station 602-2 (denoted BS2) serves a second cell (Cell2) that operates in accordance with a second RAT (RAT2). In some embodiments, one of the RATs supports MR-DC and the other RAT does not support MR-DC. For example, the WCD 612 may be a Release 16 UE, the base station 602-1 may be a Release 15 eNB that does not support MR-DC, and the base station 602-2 may be a Release 16 eNB that does support MR-DC, or vice versa; however, the present disclosure is not limited thereto.

The base station 602-1 broadcasts and the WCD 612 receives broadcast information (e.g., a SIB, e.g., SIB2, SIB4, SIB10, or SBI24) on Cell1 (step 700). This broadcast information may include (broadcasted) idle mode measurement configurations for RAT1 and/or (broadcasted) idle mode measurement configurations for RAT2, or neither, as described above. Note that some system information blocks, such as SIB2, can be broadcasted, broadcasted on-demand, or sent via dedicated signaling (e.g., RRC signaling). As such, the idle mode measurement configurations for RAT1 and/or the idle mode measurement configurations for RAT2 may be broadcasted or sent to the WCD 612 via dedicated signaling. In this example, the WCD 612 is initially connected to Cell1. At some point, the base station 602-1 sends an RRC Release message (e.g., an RRCRelease or RRCConnectionRelease) to the WCD 612 (step 702). As discussed above, the RRC Release message may include (dedicated) idle mode measurement configurations for RAT1 and/or (dedicated) idle mode measurement configurations for RAT2, or neither. The WCD 612 determines idle mode measurements to apply based on any idle mode measurement configurations received in the broadcast information of step 700 and/or the RRC Release message of step 702 (step 704). One example of how the WCD 612 makes this determination is described below with respect to FIG. 8. While in the idle mode (also referred to herein as a dormant state), the WCD 612 performs idle mode measurements in accordance with the applied idle mode measurement configurations (step 708). Depending on what idle mode measurement configurations are provided by the base station 602-1 and the determination of the WCD 612 in step 704, the idle mode measurement configurations may be performed on RAT1 carriers and/or on RAT2 carriers. For example, if the base station 602-1 is a Rel-15 eNB, then only idle mode measurement configurations for E-UTRA carriers will be configured by the Rel-15 eNB and applied by the WCD 612. Conversely, if the base station 602-1 is a Rel-16 eNB that supports MR-DC, both idle mode measurement configurations for E-UTRA carriers and idle mode measurement configurations for NR carriers will be configured and determined to be applied by the WCD 612.

In this example, while in idle mode, the WCD 612 performs a cell reselection to Cell2 (step 708). Upon reselecting to Cell2, the base station 602-2 broadcasts and the WCD 612 receives broadcast information (e.g., a SIB, e.g., SIB2, SIB4, SIB10, or SBI24) on Cell2 (step 710). This broadcast information may include (broadcasted) idle mode measurement configurations for RAT1 and/or (broadcasted) idle mode measurement configurations for RAT2, or neither, as described above. The WCD 612 determines idle mode measurements to apply based on any idle mode measurement configurations received in the broadcast information for Cell2 received in step 710 and any idle mode measurement configurations received in the RRC Release message of step 700 (received in Cell1) (step 712). One example of how the WCD 612 makes this determination is described below with respect to FIG. 9. The WCD 612 performs idle mode measurements in accordance with the idle mode measurement configurations applied din step 712 (step 714). Depending on what idle mode measurement configurations are provided by the base station 602-1 the RRC Release message of step 700 and what idle mode measurement configurations are provided by the base station 602-2 for Cell2 in the broadcast information of step 710, the idle mode measurement configurations of step 714 may be performed on RAT1 carriers and/or on RAT2 carriers. Note that, for any idle mode measurement configurations that were applied for idle mode measurements in Cell1 that are not also determined by the WCD 612 in step 712 to be applied in Cell2, idle mode measurements for those configurations/carriers is stopped (i.e., does not continue in step 714).

Figure 8:
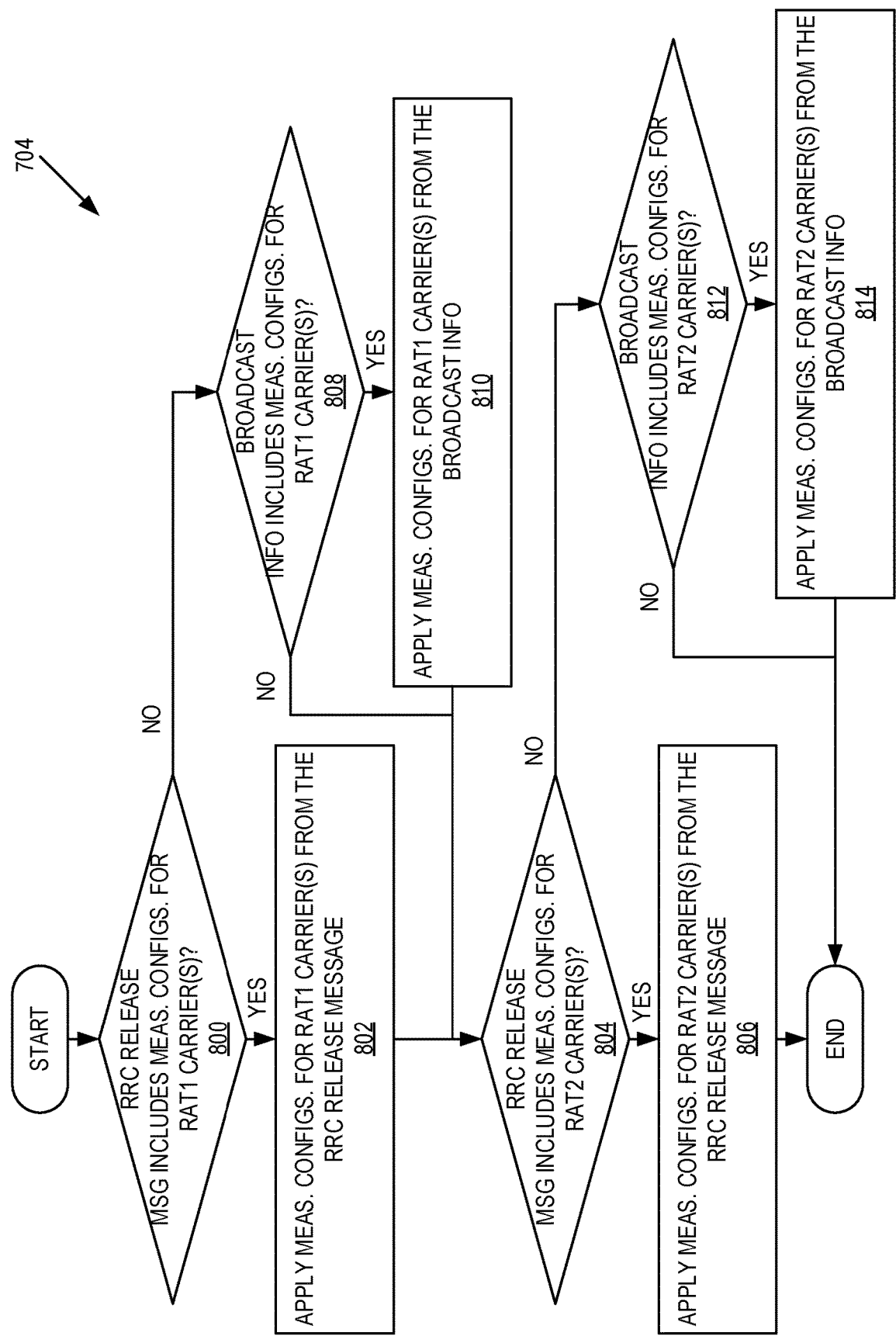
FIG. 8 is a flow chart that illustrates a process performed by a WCD to determine idle mode measurement configurations to apply based on any idle mode measurement configurations received in broadcast information in accordance with one embodiment of the present disclosure.

While any of the embodiments above may be used, FIG. 8 is a flow chart that illustrates the operation of the WCD 612 to determine idle mode measurements in step 704 of FIG. 7 in accordance with one example embodiment of the present disclosure. As illustrated, the WCD 612 determines whether the RRC Release message received on Cell1 includes idle mode measurement configurations for RAT1 carriers (step 800). If so, the WCD 612 applies the idle mode measurement configurations for the RAT1 carriers received in the RRC Release message (step 802). In other words, these idle mode measurement configurations are stored and to be used by the WCD 612 for idle mode measurements. The WCD 612 also determines whether the RRC Release message received on Cell1 includes idle mode measurement configurations for RAT2 carriers (step 804). If so, the WCD 612 applies the idle mode measurement configurations for the RAT2 carriers received in the RRC Release message (step 806). In other words, these idle mode measurement configurations are stored and to be used by the WCD 612 for idle mode measurements.

Returning to step 800, if the RRC Release message does not include idle mode measurement configurations for RAT1 carriers, the WCD 612 determines whether the broadcast information received on Cell1 includes idle mode measurement configurations for RAT1 carriers (step 808). If not, the process proceeds to step 804, as described above. If the broadcast information received on Cell1 does include idle mode measurement configurations for RAT1 carriers, the WCD 612 applies the idle mode measurement configurations for the RAT1 carriers received in the broadcast information on Cell1 (step 810). In other words, these idle mode measurement configurations are stored and to be used by the WCD 612 for idle mode measurements.

Returning to step 804, if the RRC Release message does not include idle mode measurement configurations for RAT2 carriers, the WCD 612 determines whether the broadcast information received on Cell1 includes idle mode measurement configurations for RAT2 carriers (step 812). If so, the WCD 612 applies the idle mode measurement configurations for the RAT2 carriers received in the broadcast information on Cell1 (step 814). In other words, these idle mode measurement configurations are stored and to be used by the WCD 612 for idle mode measurements.

Figure 9:
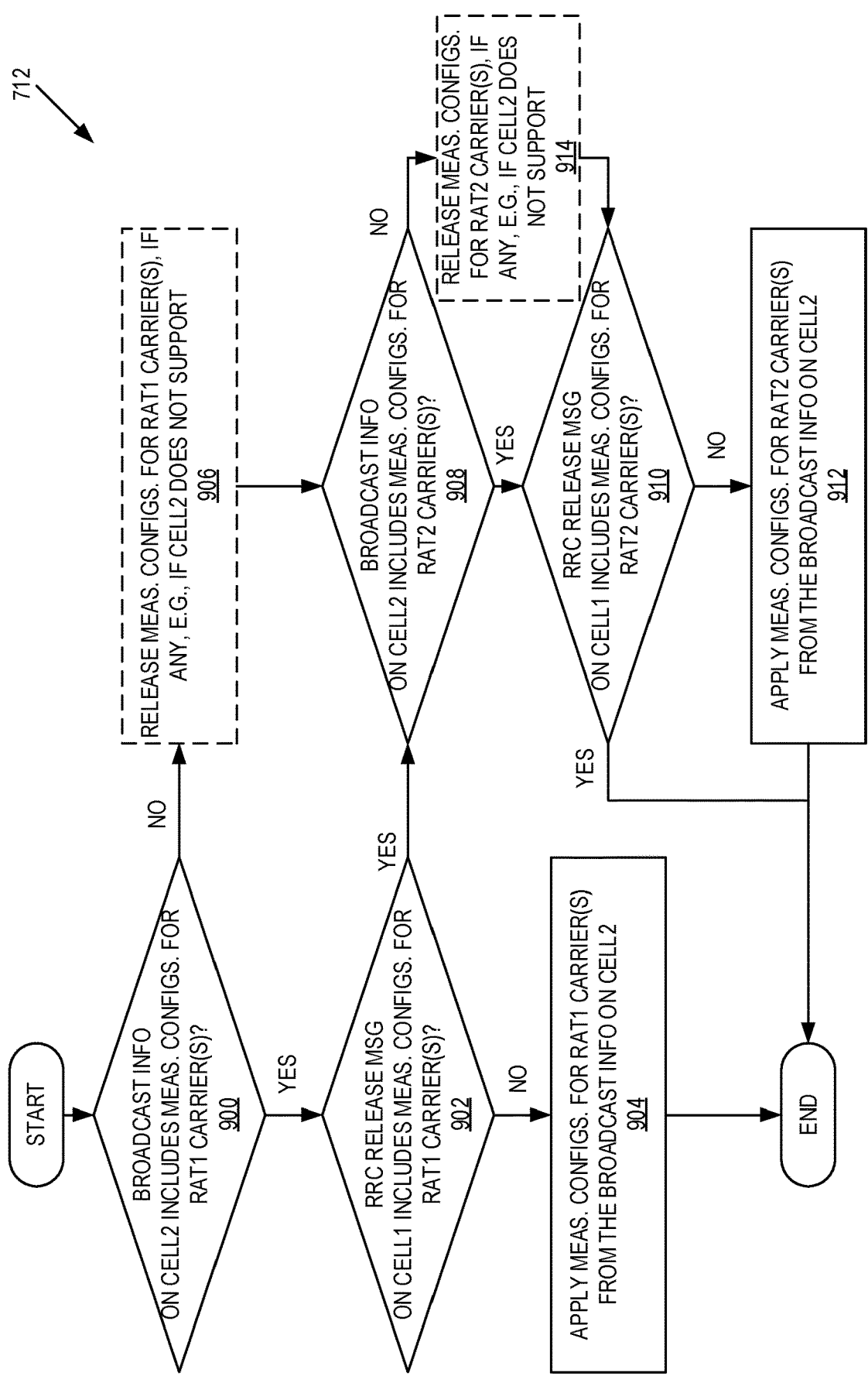
FIG. 9 is a flow chart that illustrates a process performed by a WCD after cell reselection to determine idle mode measurement configurations to apply based on any idle mode measurement configurations received in broadcast information in a target cell of the cell reselection and any idle mode measurement configurations received in a Radio Resource Control (RRC) release in a source cell of the cell reselection in accordance with one embodiment of the present disclosure.

While any of the embodiments above may be used, FIG. 9 is a flow chart that illustrates the operation of the WCD 612 to determine idle mode measurements in step 712 of FIG. 7 (i.e., (after reselection to Cell2) in accordance with one example embodiment of the present disclosure. As illustrated, the WCD 612 determines whether the broadcast information received on Cell2 includes idle mode measurement configurations for RAT1 carriers (step 900). If so, the WCD 612 determines whether the RRC Release message received on Cell1 included idle mode measurement configurations for RAT1 carriers (step 902). If so, the WCD 612 does not apply the idle mode measurement configurations for the RAT1 carriers received in the broadcast information on Cell2 and the process proceeds to step 906, as described below. However, if the RRC Release message received on Cell1 did not include idle mode measurement configurations for RAT1 carriers, the WCD 612 applies the idle mode measurement configurations for the RAT1 carriers received in the broadcast information on Cell2 (step 904). In other words, these idle mode measurement configurations are stored and to be used by the WCD 612 for idle mode measurements.

Returning to step 900, optionally, the WCD 612 releases any idle mode measurement configurations for RAT1 carriers if, e.g., Cell2 does not support idle mode measurements on both RAT1 and RAT2 (e.g., if Cell2 does not support MR-DC), as described above (step 906). Note that, even if released, these idle mode measurement configurations for RAT1 carriers may still be stored by the WCD 612 and subsequently applied if, e.g., the WCD 612 reselects back to Cell1. In some embodiments, the WCD 612 only releases the idle mode measurement configurations for RAT1 carriers in step 906 if these idle mode measurement configurations for RAT1 carriers where received in Cell1 via broadcast signaling (i.e., if they were not received in Cell1 via RRC or dedicated signaling); otherwise, the WCD 612 keeps (and applies) these idle mode measurement configurations. The WCD 612 determines whether the broadcast information received on Cell2 includes idle mode measurement configurations for RAT2 carriers (step 908). If so, the WCD 612 determines whether the RRC Release message received on Cell1 included idle mode measurement configurations for RAT2 carriers (step 910). If so, the WCD 612 does not apply the idle mode measurement configurations for the RAT2 carriers received in the broadcast information on Cell2 and the process ends. However, if the RRC Release message received on Cell1 did not include idle mode measurement configurations for RAT2 carriers, the WCD 612 applies the idle mode measurement configurations for the RAT2 carriers received in the broadcast information on Cell2 (step 912). In other words, these idle mode measurement configurations are stored and to be used by the WCD 612 for idle mode measurements.

Returning to step 908, if the broadcast information received on Cell2 does not include idle mode measurement configurations for RAT2 carriers, optionally, the WCD 612 releases any idle mode measurement configurations for RAT2 carriers if, e.g., Cell2 does not support idle mode measurements on both RAT1 and RAT2 (e.g., if Cell2 does not support MR-DC), as described above (step 914). Note that, even if released, these idle mode measurement configurations for RAT2 carriers may still be stored by the WCD 612 and subsequently applied if, e.g., the WCD 612 reselects back to Cell1. In some embodiments, the WCD 612 only releases the idle mode measurement configurations for RAT2 carriers in step 914 if these idle mode measurement configurations for RAT2 carriers where received in Cell1 via broadcast signaling (i.e., if they were not received in Cell1 via RRC or dedicated signaling); otherwise, the WCD 612 keeps (and applies) these idle mode measurement configurations.

Note that any additional details described herein regarding configuring and handling idle mode measurement configurations for multiple RATs are also applicable to FIGS. 7, 8, and 9.

Below are some example embodiments of configuring and handling idle mode measurement configurations for multiple RATs. These embodiments may, e.g., be implemented using the processes described above, e.g., with respect to FIGS. 7-9.

In some embodiments of the present disclosure, mechanisms to handle early measurement configurations for LTE and NR are provided. In some embodiments, the method comprises using independent handling for LTE and NR configurations. That way, the network is able to configure the LTE and NR measurement configurations independently. For example, the network can configure the UE with dedicated measurement configurations for LTE and instruct the UE to apply broadcasted configurations for NR, or vice versa (e.g., in steps 700 and/or 800). The configuration for both can be received via broadcast, or another possibility is to have them both via dedicated.

If a Rel-16 UE is released while being served by a Rel-15 eNB, it will receive configurations to measure only on LTE frequencies (e.g., in step 702). If the UE later re-selects to a Rel-16 eNB that is capable of configuring NR idle mode measurements (e.g., in step 708), the UE obtains the NR measurement configuration from the broadcasted information (e.g., in step 710) and performs idle mode measurements on NR carriers based on that, while continuing to perform the LTE measurements based on the configurations received in the source cell (e.g., using steps 712 and 714).

If a UE is configured with only NR early measurement configurations in an NR node (gNB) that doesn't support MR-DC (e.g., in steps 700 and/or 702) and then re-selects to another cell in another NR node that does support MR-DC (e.g., in step 708), the UE obtains the LTE early measurement configurations from the broadcasted information in the target cell (e.g., in step 710) and performs idle mode measurements on LTE based on that, while continuing to perform the early measurement configurations for the NR carriers based on the configurations received in the source cell (e.g., using steps 712 and 714).

If a Rel-16 UE is released while being served by a Rel-16 eNB, it will receive configurations to measure on both LTE and NR frequencies (e.g., in step 702). If the UE later re-selects to a Rel-15 eNB capable of configuring only LTE idle mode measurements (e.g., in step 708), the UE releases the stored NR measurement configuration and stops performing the measurements on NR frequencies (e.g., in step 712). Another realization is for the UE to stop performing the NR measurements, but still keep the configurations (e.g., so that it can resume the NR measurements if it re-selects again to a cell that support NR idle mode measurements).

If a Rel-16 UE is released while being served by a Rel-16 gNB that is capable of MR-DC, it will receive configurations to measure on both LTE and NR frequencies (e.g., in step 702). If the UE later re-selects to a Rel-16 gNB that is not capable of MR-DC (e.g., in step 708), the UE releases the LTE idle mode measurements and stops performing the measurements on LTE frequencies (e.g., in step 712). Another realization is for the UE to stop performing the LTE measurements, but still keep the stored configurations (e.g., so that it can resume the LTE measurements if it re-selects again to a gNB/cell that supports MR-DC).

Figure 10:
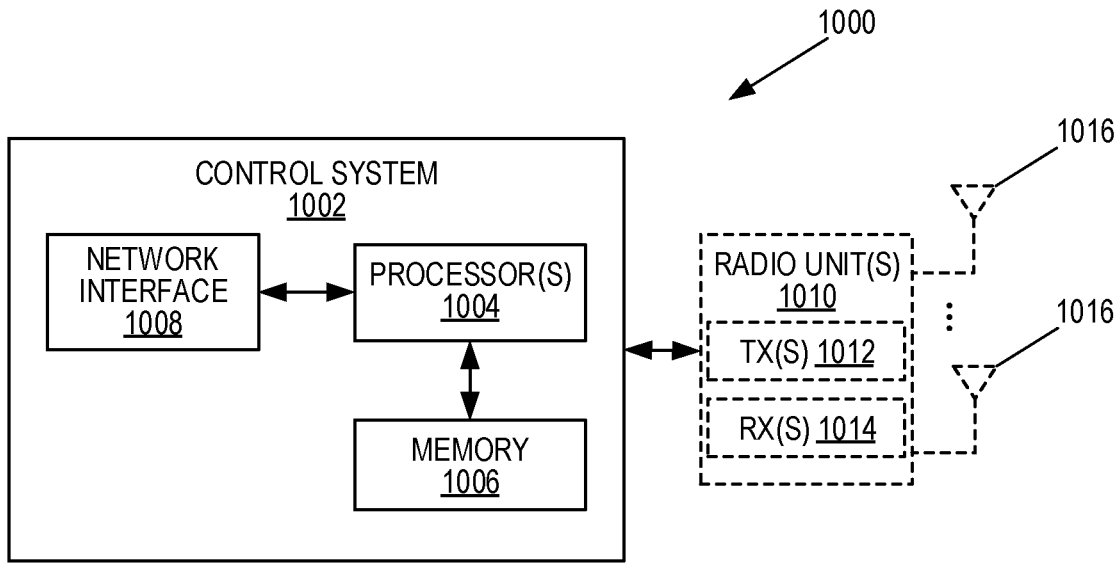
FIGS. 10 through 12 are schematic block diagrams of example embodiments of a radio access node.

FIG. 10 is a schematic block diagram of a radio access node 1000 according to some embodiments of the present disclosure. Optional features are represented by dashed boxes. The radio access node 1000 may be, for example, a base station 602 or 606 or a network node that implements all or part of the functionality of the base station 602 or eNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein (e.g., one or more functions of an eNB or base station 602-1 or base station 602-2 described above, e.g., with respect to FIG. 7). In some embodiments, the function(s) are implemented in software that is stored, e.g., in the memory 1006 and executed by the one or more processors 1004.

Figure 11:
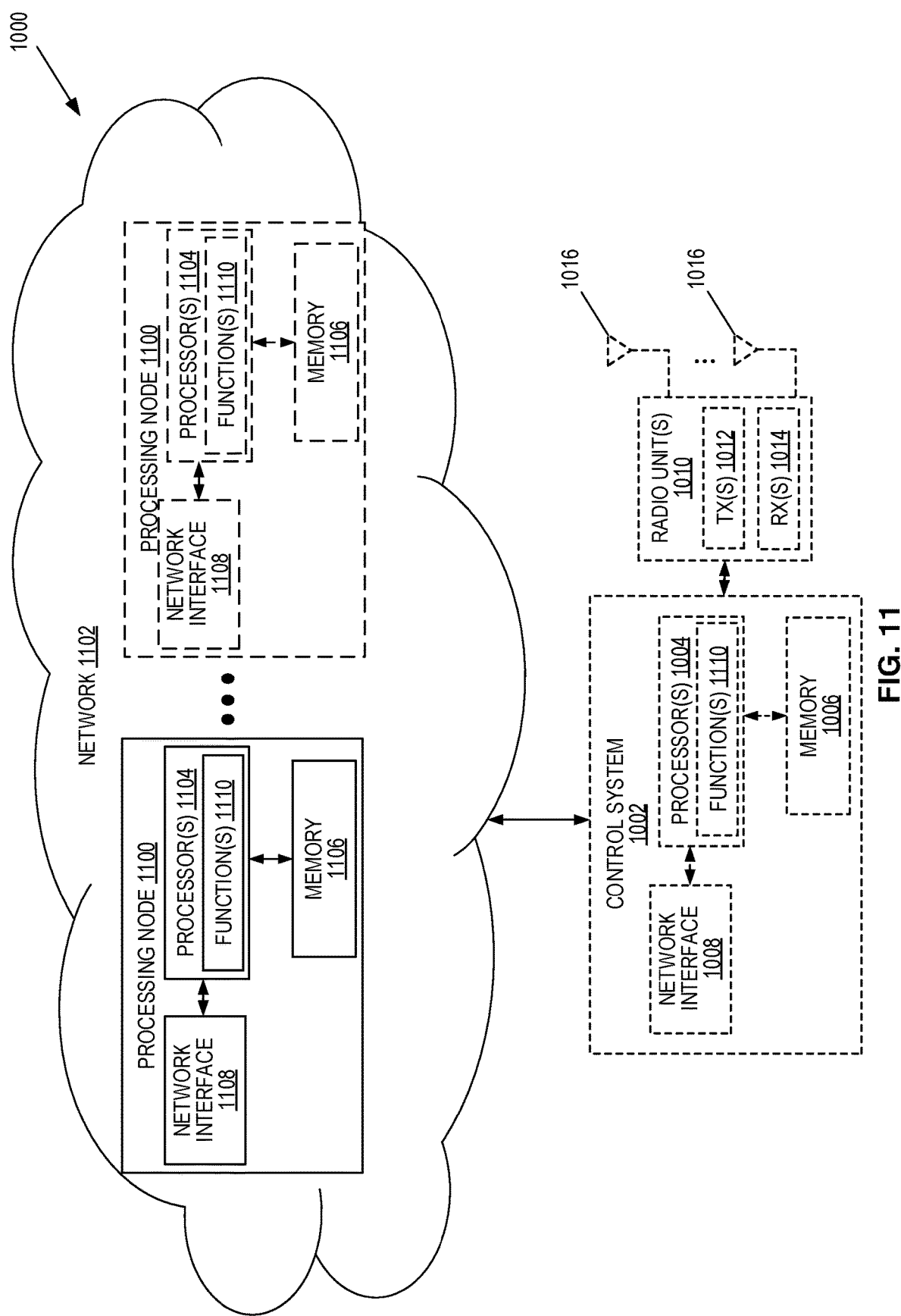

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein (e.g., one or more functions of an eNB or base station 602-1 or base station 602-2 described above, e.g., with respect to FIG. 7) are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein (e.g., one or more functions of an eNB or base station 602-1 or base station 602-2 described above, e.g., with respect to FIG. 7) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
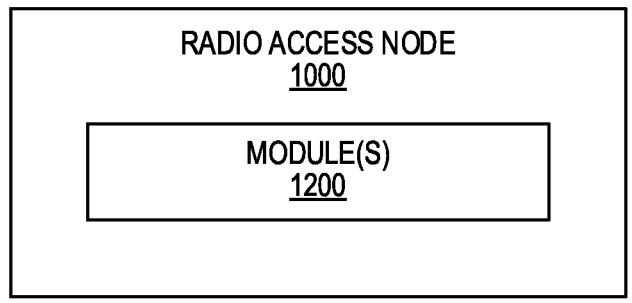

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein (e.g., one or more functions of an eNB or base station 602-1 or base station 602-2 described above, e.g., with respect to FIG. 7). This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
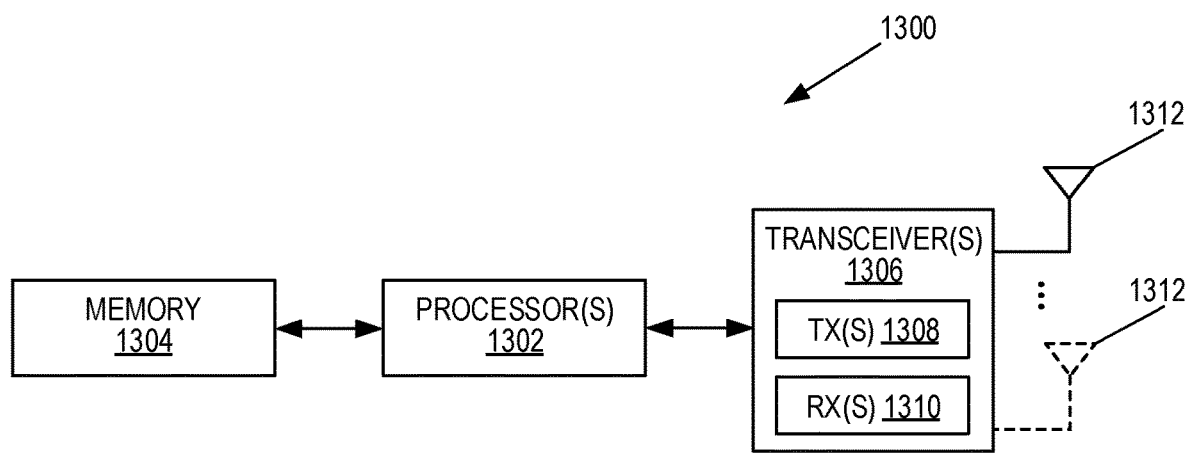
FIGS. 13 and 14 are schematic block diagrams of example embodiments of a WCD.

FIG. 13 is a schematic block diagram of a wireless communication device 1300 according to some embodiments of the present disclosure. The wireless communication device 1300 may be, e.g., the WCD 612. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above (e.g., one or more functions of a UE or the WCD 612 described above, e.g., with respect to FIGS. 7-9) may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein (e.g., one or more functions of a UE or the WCD 612 described above, e.g., with respect to FIGS. 7-9) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
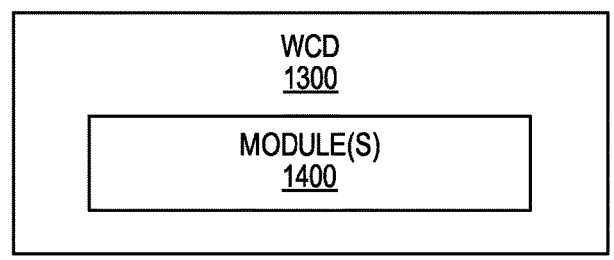

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein (e.g., one or more functions of a UE or the WCD 612 described above, e.g., with respect to FIGS. 7-9).

Figure 15:
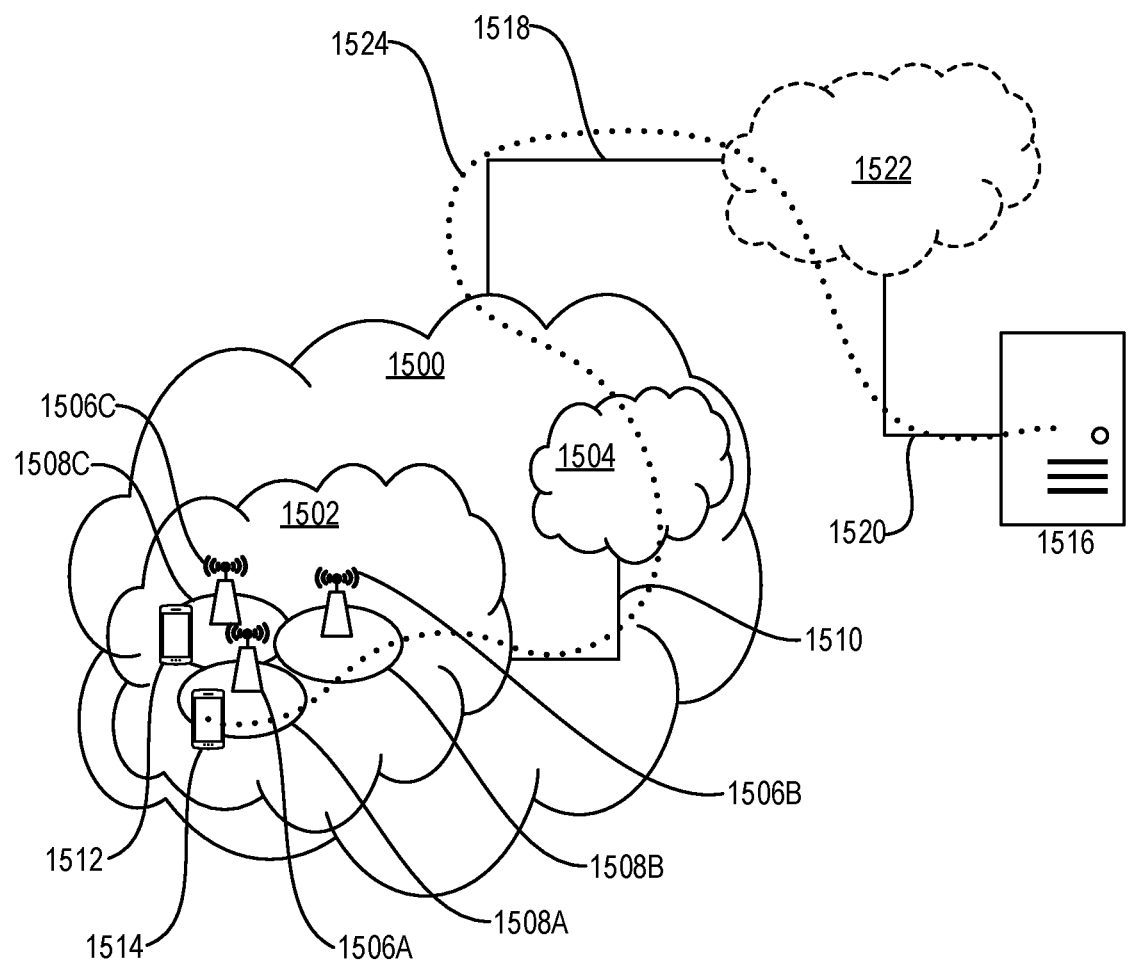
FIG. 15 illustrates an example embodiment of a communication system in which embodiments of the present disclosure may be implemented.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
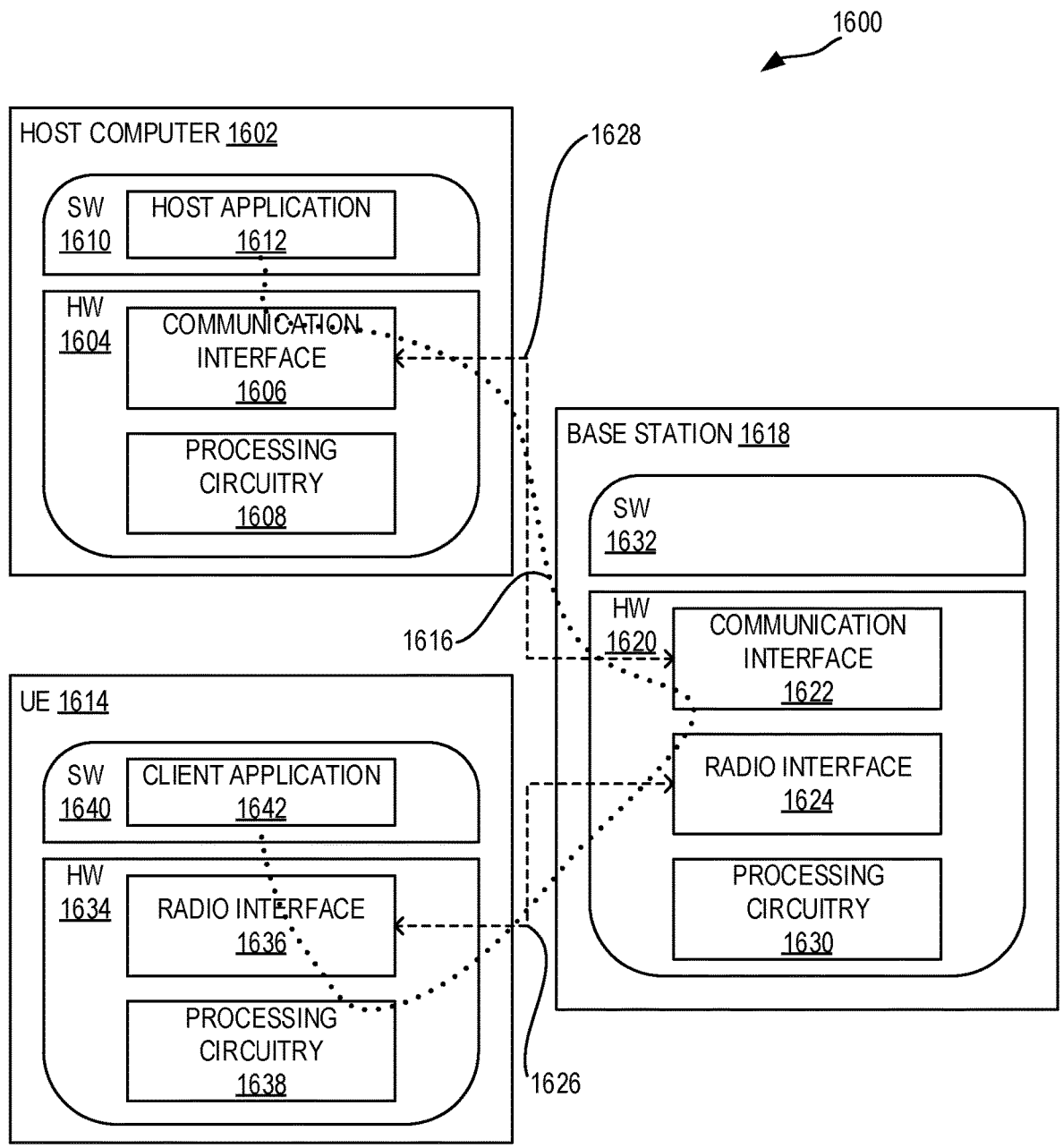
FIG. 16 illustrates example embodiments of the host computer, base station, and UE of FIG. 15.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device, the method comprising any one or more of the following:
receiving (700) a system information block (SIB) message from a first cell in a first network node;
receiving (702) a radio resource control (RRC), release message from a first network node;
determining (704) whether the RRC release message includes an idle mode measurement configuration;
upon determining the RRC release message includes an idle mode measurement configurations:
  determining (704; 800) whether RRC release message includes idle mode measurement configurations for E-UTRA carriers and if so, applying (704; 802) the configurations;
  determining (704; 804) whether RRC release message includes idle mode measurement configurations for NR carriers and if so, applying (704; 806) the configurations;
upon determining that the RRC release message does not include idle mode measurement configurations for E-UTRA carriers:
  determining (704; 808) whether broadcasted system information includes idle mode measurement configuration for E-UTRA carriers and, if so, applying (704; 810) the configurations upon determining that the RRC release message does not include idle mode measurement configurations for NR carriers:
  determining (704; 812) whether broadcasted system information includes idle mode measurement configuration for NR carriers and, if so, applying (704; 814) the configurations
perform (706) idle mode measurements on E-UTRA and/or NR carriers according to received configurations
report (716) idle mode measurement results to the network upon resuming or establishing an RRC connection with the network.

Embodiment 2: The method of any of embodiments 1, wherein the received RRC release message does not include idle mode measurement configurations for E-UTRA carriers, and the method further comprises, upon re-selecting to another second cell in a second network node: receiving (710) a system information block (SIB) message from the second cell in the second network node comprising idle mode measurement configurations for E-UTRA carriers; replacing or applying (712) the received broadcasted idle mode measurement configurations for E-UTRA carriers; and performing (714) idle mode measurements on E-UTRA carriers according to the received broadcasted idle mode measurement configurations.

Embodiment 3: The method of any of embodiments 1, wherein the received RRC release message does not include idle mode measurement configurations for NR carriers, and the method further comprises, upon re-selecting to another second cell in a second network node: receiving (710) a system information block (SIB) message from the second cell in the second network node comprising idle mode measurement configurations for NR carriers; replacing or applying (712) the received broadcasted idle mode measurement configurations for NR carriers; and performing (714) idle mode measurements on NR carriers according to the received broadcasted idle mode measurement configurations.

Embodiment 4: The method of any of embodiments 1-3, wherein the received RRC release message comprises one of an RRCRelease message or an RRCConnectionRelease message.

Embodiment 5: The method of any of embodiments 1-4, wherein the received SIB message comprises one of a SIB2, SIB4, SIB10 and SIB24.

Embodiment 6: A method performed by a wireless communication device for handling idle mode measurement configurations for multiple radio access technologies, the method comprising: receiving (700; 702), on a first cell served by a first base station (602-1), idle mode measurement configurations for one or more carriers for a first radio access technology, idle mode measurement configurations for one or more carriers for a second radio access technology, or both idle mode measurement configurations for one or more carriers for the first radio access technology and idle mode measurement configurations for one or more carriers for the second radio access technology; determining (704) idle mode measurement configurations to be applied by the wireless communication device (612) while in the first cell based on the idle mode measurement configurations received on the first cell; and performing (706) idle mode measurements using the determined idle mode measurement configurations to be applied by the wireless communication device (612) while in the first cell.

Embodiment 7: The method of embodiment 6 further comprising: performing (708) a reselection to a second cell served by a second base station (602-2); receiving (710), in the second cell, idle mode measurement configurations for one or more carriers for the first radio access technology, idle mode measurement configurations for one or more carriers for the second radio access technology, or both idle mode measurement configurations for one or more carriers for the first radio access technology and idle mode measurement configurations for one or more carriers for the second radio access technology; determining (712) idle mode measurement configurations to be applied by the wireless communication device (612) while in the second cell based on the idle mode measurement configurations received on the first cell and the idle mode measurement configurations received on the second cell; and performing (714) idle mode measurements using the determined idle mode measurement configurations to be applied by the wireless communication device (612) while in the second cell.

Embodiment 8: The method of embodiment 7 wherein receiving (710) comprises receiving (710) broadcast information on the second cell, the broadcast information comprising idle mode measurement configurations for one or more carriers for the first radio access technology, idle mode measurement configurations for one or more carriers for the second radio access technology, or both idle mode measurement configurations for one or more carriers for the first radio access technology and idle mode measurement configurations for one or more carriers for the second radio access technology.

Embodiment 9: The method of embodiment 8 further comprising reporting (716) at least some of the performed idle mode measurements to the second base station (602-2), e.g., upon resuming a RRC connection with the second base station (602-2).

Embodiment 10: The method of embodiment 8 or 9 wherein determining (712) idle mode measurement configurations to be applied by the wireless communication device (612) while in the second cell comprises: determining (900, YES) that the broadcast information received on the second cell comprises idle mode measurement configurations for one or more carriers on the first radio access technology; determining (902, NO) that an RRC Release message received by the wireless communication device (612) in the first cell does not include idle mode measurement configurations for any carriers on the first radio access technology; and, upon determining that the RRC Release message received by the wireless communication device (612) in the first cell does not include idle mode measurement configurations for any carriers on the first radio access technology and determining that the broadcast information received on the second cell comprises idle mode measurement configurations for one or more carriers on the first radio access technology, applying (904) the idle mode measurement configurations for the one or more carriers on the first radio access technology received in the broadcast information on the second cell.

Embodiment 11: The method of embodiment 8 or 9 wherein determining (712) idle mode measurement configurations to be applied by the wireless communication device (612) while in the second cell comprises: determining (908, YES) that the broadcast information received on the second cell comprises idle mode measurement configurations for one or more carriers on the second radio access technology; determining (910, NO) that an RRC Release message received by the wireless communication device (612) in the first cell does not include idle mode measurement configurations for any carriers on the second radio access technology; and, upon determining that the RRC Release message received by the wireless communication device (612) in the first cell does not include idle mode measurement configurations for any carriers on the second radio access technology and determining that the broadcast information received on the second cell comprises idle mode measurement configurations for one or more carriers on the second radio access technology, applying (912) the idle mode measurement configurations for the one or more carriers on the second radio access technology received in the broadcast information on the second cell.

Embodiment 12: The method of any of embodiments 6-11, wherein receiving (702) the idle mode measurement configurations on the first cell comprises receiving (702) an RRC Release message on the first cell, the RRC Release message comprising idle mode measurement configurations for the first radio access technology and/or idle mode measurement configurations for the first radio access technology.

Embodiment 13: The method of embodiment 12 wherein the received RRC release message comprises an RRCRelease message or an RRCConnectionRelease message.

Embodiment 14: The method of any of embodiments 6-13, wherein receiving (700) the idle mode measurement configurations on the first cell comprises receiving (700) a system information on the first cell, the system information comprising idle mode measurement configurations for the first radio access technology and/or idle mode measurement configurations for the first radio access technology.

Embodiment 15: The method of embodiment 14 wherein the received system information is a SIB message.

Embodiment 16: The method of embodiment 15 wherein the SIB message is a SIB2, SIB4, SIB10 or SIB24.

Embodiment 17: The method of any of embodiments 6-11, wherein receiving (710) the idle mode measurement configurations on the second cell comprises receiving (710) system information on the second cell, the system information comprising idle mode measurement configurations for the first radio access technology and/or idle mode measurement configurations for the first radio access technology.

Embodiment 18: The method of embodiment 17 wherein the received system information is a SIB message.

Embodiment 19: The method of embodiment 18 wherein the SIB message is a SIB2, SIB4, SIB10 or SIB24.

Embodiment 20: The method of any of the previous embodiments, further comprising: providing user data; and forwarding the user data to a host computer via the transmission to the base station.

Group B Embodiments

Embodiment 21: A method performed by a base station configuring idle mode measurement configurations for multiple radio access technologies, the method comprising: sending (700; 702), on a first cell served by the base station (602-1), first idle mode measurement configurations for one or more carriers for a first radio access technology and second idle mode measurement configurations for one or more carriers for a second radio access technology.

Embodiment 22: The method of any of the previous embodiments, further comprising: obtaining user data; and forwarding the user data to a host computer or a wireless device.

Group C Embodiments

Embodiment 23: A wireless communication device comprising: processing circuitry configured to perform any of the steps of any of the Group A embodiments; and power supply circuitry configured to supply power to the wireless communication device.

Embodiment 24: A base station comprising: processing circuitry configured to perform any of the steps of any of the Group B embodiments; and power supply circuitry configured to supply power to the base station.

Embodiment 25: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 26: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 27: The communication system of the previous embodiment further including the base station.

Embodiment 28: The communication system of the previous 2 embodiments, further including the UE, wherein the UE is configured to communicate with the base station.

Embodiment 29: The communication system of the previous 3 embodiments, wherein: the processing circuitry of the host computer is configured to execute a host application, thereby providing the user data; and the UE comprises processing circuitry configured to execute a client application associated with the host application.

Embodiment 30: The method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 31: The method of the previous embodiment, further comprising, at the base station, transmitting the user data.

Embodiment 32: The method of the previous 2 embodiments, wherein the user data is provided at the host computer by executing a host application, the method further comprising, at the UE, executing a client application associated with the host application.

Embodiment 33: A User Equipment, UE, configured to communicate with a base station, the UE comprising a radio interface and processing circuitry configured to perform the method of the previous 3 embodiments.

Embodiment 34: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 35: The communication system of the previous embodiment, wherein the cellular network further includes a base station configured to communicate with the UE.

Embodiment 36: The communication system of the previous 2 embodiments, wherein: the processing circuitry of the host computer is configured to execute a host application, thereby providing the user data; and the UE's processing circuitry is configured to execute a client application associated with the host application.

Embodiment 37: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 38: The method of the previous embodiment, further comprising at the UE, receiving the user data from the base station.

Embodiment 39: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 40: The communication system of the previous embodiment, further including the UE.

Embodiment 41: The communication system of the previous 2 embodiments, further including the base station, wherein the base station comprises a radio interface configured to communicate with the UE and a communication interface configured to forward to the host computer the user data carried by a transmission from the UE to the base station.

Embodiment 42: The communication system of the previous 3 embodiments, wherein: the processing circuitry of the host computer is configured to execute a host application; and the UE's processing circuitry is configured to execute a client application associated with the host application, thereby providing the user data.

Embodiment 43: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 44: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 45: The method of the previous embodiment, further comprising, at the UE, providing the user data to the base station.

Embodiment 46: The method of the previous 2 embodiments, further comprising: at the UE, executing a client application, thereby providing the user data to be transmitted; and at the host computer, executing a host application associated with the client application.

Embodiment 47: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 48: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 49: The communication system of the previous embodiment further including the base station.

Embodiment 50: The communication system of the previous 2 embodiments, further including the UE, wherein the UE is configured to communicate with the base station.

Embodiment 51: The communication system of the previous 3 embodiments, wherein: the processing circuitry of the host computer is configured to execute a host application; and the UE is configured to execute a client application associated with the host application, thereby providing the user data to be received by the host computer.

Embodiment 52: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 53: The method of the previous embodiment, further comprising at the base station, receiving the user data from the UE.

Embodiment 54: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless communication device, the method comprising:
  receiving system information from a first cell of a first network node;
  receiving a dedicated release message from the first cell of the first network node, wherein the dedicated release message comprises:
    idle mode measurement configurations for one or more carriers for a first Radio Access Technology, RAT;
    idle mode measurement configurations for one or more carriers for a second RAT; or
    both idle mode measurement configurations for one or more carriers for the first RAT and idle mode measurement configurations for one or more carriers for the second RAT;
  determining idle mode measurement configurations to be applied by the wireless communication device while in the first cell based on the idle mode measurement configurations received on the first cell;
  applying the determined idle mode measurement configurations for idle mode measurements while in the first cell;
  performing idle mode measurements using the applied idle mode measurement configurations for idle mode measurements while in the first cell;
  performing a reselection to a second cell served by a second base station;
  receiving system information from the second cell of a second network node, the system information received from the second cell comprising:
    idle mode measurement configurations for one or more carriers for the first RAT;
    idle mode measurement configurations for one or more carriers for the second RAT; or
    both idle mode measurement configurations for one or more carriers for the first RAT and idle mode measurement configurations for one or more carriers for the second RAT;
  determining idle mode measurement configurations to be applied by the wireless communication device while in the second cell based on:
    the idle mode measurement configurations comprised in the dedicated release message received from the first cell; and
    the idle mode measurement configurations comprised in the system information received from the second cell;
  applying the determined idle mode measurement configurations for idle mode measurements while in the second cell; and
  performing idle mode measurements using the applied idle mode measurement configurations for idle mode measurements while in the second cell,
  for each RAT from among the first RAT and the second RAT:
    determining whether the dedicated release message from the first cell comprises an idle mode measurement configuration for one or more carriers of the RAT; and
    upon determining that the dedicated release message from the first cell comprises an idle mode measurement configuration for one or more carriers of the RAT, applying the idle mode measurement configuration for the one or more carriers of the RAT comprised in the dedicated release message from the first cell, for each RAT from among the first RAT and the second RAT:
  upon determining that the dedicated release message from the first cell does not comprise an idle mode measurement configuration for one or more carriers of the RAT:
    determining whether the system information from the first cell comprises an idle mode measurement configuration for one or more carriers of the RAT; and
    upon determining that the system information from the first cell comprises an idle mode measurement configuration for one or more carriers of the RAT, applying the idle mode measurement configuration for the one or more carriers of the RAT comprised in the system information from the first cell.

2. The method of claim 1 further comprising reporting results of the performed idle mode measurements to a network node upon resuming or establishing a connection with the network node.

3. The method of any of claim 1 wherein determining idle mode measurement configurations to be applied by the wireless communication device while in the second cell comprises:
  for each RAT from among the first RAT and the second RAT:
    determining whether the system information received from the second cell comprises idle mode measurement configurations for one or more carriers of the RAT;
    determining whether the dedicated release message received from the first cell comprises idle mode measurement configurations for one or more carriers of the RAT; and
    upon determining that the system information received from the second cell comprises idle mode measurement configurations for one or more carriers of the RAT and determining that the dedicated release message received from the first cell does comprise idle mode measurement configurations for one or more carriers of the RAT, continuing to perform idle mode measurements in accordance with the idle mode measurement configurations for one or more carriers of the RAT comprised in the dedicated release message received from the first cell.

4. The method of claim 3 wherein determining idle mode measurement configurations to be applied by the wireless communication device while in the second cell further comprises:
for each RAT from among the first RAT and the second RAT:
upon determining that the system information received from the second cell comprises idle mode measurement configurations for one or more carriers of the RAT and determining that the dedicated release message received from the first cell does not comprise idle mode measurement configurations for one or more carriers of the RAT, applying the idle mode measurement configurations for one or more carriers of the RAT comprised in the system information received from the second cell.

5. The method of claim 1 wherein the first cell is of the first RAT, the dedicated release message from the first cell comprises idle mode measurement configurations for one or more carriers for the first RAT, the second cell does not support idle mode measurements for the first RAT, and the method further comprises, upon reselecting to the second cell for the second RAT:
releasing the idle mode measurement configurations for the one or more carriers for the first RAT; and
storing the idle mode measurement configurations for the one or more carriers for the first RAT.

6. The method of claim 5 further comprising applying the stored idle mode measurement configurations for the one or more carriers for the first RAT upon reselecting to a cell that supports idle mode measurement configurations for the first RAT.

7. The method claim 1 wherein:
the first RAT is Evolved Universal Terrestrial Radio Access, E-UTRA, and the second RAT is New Radio, NR; or
the first RAT is NR and the second RAT is E-UTRA.

8. The method of claim 1 wherein the received dedicated release message comprises one of an RRCRelease message or an RRCConnectionRelease message.

9. The method of claim 1 wherein the received system information is comprised in a System Information Block, SIB, message, wherein the SIB message comprises one of a SIB2 message, a SIB4 message, a SIB10 message, and a SIB24 message.

10. A wireless communication device for performing idle mode measurements in a cellular communications system, the wireless communication device comprising:
one or more transmitters;
one or more receivers; and
processing circuitry configured to cause the wireless communication device to:
receive system information from a first cell of a first network node;
receive a dedicated release message from the first cell of the first network node, wherein the dedicated release message comprises:
idle mode measurement configurations for one or more carriers for a first Radio Access Technology, RAT;
idle mode measurement configurations for one or more carriers for a second RAT; or
both idle mode measurement configurations for one or more carriers for the first RAT and idle mode measurement configurations for one or more carriers for the second RAT;
determine idle mode measurement configurations to be applied by the wireless communication device while in the first cell based on the idle mode measurement configurations received on the first cell;
apply the determined idle mode measurement configurations for idle mode measurements while in the first cell;
perform idle mode measurements using the applied idle mode measurement configurations for idle mode measurements while in the first cell;
perform a reselection to a second cell served by a second base station;
receive system information from the second cell of a second network node, the system information received from the second cell comprising:
idle mode measurement configurations for one or more carriers for the first RAT;
idle mode measurement configurations for one or more carriers for the second RAT; or
both idle mode measurement configurations for one or more carriers for the first RAT and idle mode measurement configurations for one or more carriers for the second RAT;
determine idle mode measurement configurations to be applied by the wireless communication device while in the second cell based on:
the idle mode measurement configurations comprised in the dedicated release message received from the first cell; and
the idle mode measurement configurations comprised in the system information received from the second cell;
apply the determined idle mode measurement configurations for idle mode measurements while in the second cell; and
perform idle mode measurements using the applied idle mode measurement configurations for idle mode measurements while in the second cell,
for each RAT from among the first RAT and the second RAT:
determine whether the dedicated release message from the first cell comprises an idle mode measurement configuration for one or more carriers of the RAT; and
upon determining that the dedicated release message from the first cell comprises an idle mode measurement configuration for one or more carriers of the RAT, apply the idle mode measurement configuration for the one or more carriers of the RAT comprised in the dedicated release message from the first cell,
for each RAT from among the first RAT and the second RAT:
upon determining that the dedicated release message from the first cell does not comprise an idle mode measurement configuration for one or more carriers of the RAT:
determining whether the system information from the first cell comprises an idle mode measurement configuration for one or more carriers of the RAT; and upon determining that the system information from the first cell comprises an idle mode measurement configuration for one or more carriers of the RAT, applying the idle mode measurement configuration for the one or more carriers of the RAT comprised in the system information from the first cell.

11. The wireless communication device of claim 10 wherein the processing circuitry is further configured to cause the wireless communication device to report results of the performed idle mode measurements to a network node upon resuming or establishing a connection with the network node.

12. The wireless communication device of claim 10 wherein, in order to determine idle mode measurement configurations to be applied by the wireless communication device while in the second cell, the processing circuitry is further configured to cause the wireless communication device to:
for each RAT from among the first RAT and the second RAT:
determine whether the system information received from the second cell comprises idle mode measurement configurations for one or more carriers of the RAT;
determine whether the dedicated release message received from the first cell comprises idle mode measurement configurations for one or more carriers of the RAT; and
upon determining that the system information received from the second cell comprises idle mode measurement configurations for one or more carriers of the RAT and determining that the dedicated release message received from the first cell does comprise idle mode measurement configurations for one or more carriers of the RAT, continue to perform idle mode measurements in accordance with the idle mode measurement configurations for one or more carriers of the RAT comprised in the dedicated release message received from the first cell.

13. The wireless communication device of claim 12 wherein, in order to determine idle mode measurement configurations to be applied by the wireless communication device while in the second cell, the processing circuitry is further configured to cause the wireless communication device to:
for each RAT from among the first RAT and the second RAT:
upon determining that the system information received from the second cell comprises idle mode measurement configurations for one or more carriers of the RAT and determining that the dedicated release message received from the first cell does not comprise idle mode measurement configurations for one or more carriers of the RAT, apply the idle mode measurement configurations for one or more carriers of the RAT comprised in the system information received from the second cell.

14. The wireless communication device of claim 10 wherein the dedicated release message from the first cell comprises idle mode measurement configurations for one or more carriers for the first RAT, the second cell does not support idle mode measurements for the first RAT, and the processing circuitry is further configured to cause the wireless communication device to, upon reselecting to the second cell for the second RAT:
release the idle mode measurement configurations for the one or more carriers for the first RAT; and
store the idle mode measurement configurations for the one or more carriers for the first RAT.

15. The wireless communication device of claim 14 wherein the processing circuitry is further configured to cause the wireless communication device to apply the stored idle mode measurement configurations for the one or more carriers for the first RAT upon reselecting to a cell that supports idle mode measurement configurations for the first RAT.

16. The wireless communication device of claim 10 wherein:
the first RAT is Evolved Universal Terrestrial Radio Access, E-UTRA, and the second RAT is New Radio, NR; or
the first RAT is NR and the second RAT is E-UTRA.

17. The wireless communication device of claim 10 wherein the received release message comprises one of an RRCRelease message or an RRCConnectionRelease message.

18. The wireless communication device of claim 10 wherein the received system information is comprised in a System Information Block, SIB, message, wherein the SIB message comprises one of a SIB2 message, a SIB4 message, a SIB10 message, and a SIB24 message.

* * * * *

UNITED STATES PATENT AND TRADEMARK OFFICE
CERTIFICATE OF CORRECTION

PATENT NO. : 12,114,212 B2  
APPLICATION NO. : 17/770530  
DATED : October 8, 2024  
INVENTOR(S) : Teyeb et al.

Page 1 of 1

It is certified that error appears in the above-identified patent and that said Letters Patent is hereby corrected as shown below:

In the Specification

In Column 6, Line 31, delete "IR" and insert -- NR --, therefor.

In Column 14, Line 4, delete "Mobility" and insert -- Mobility Management --, therefor.

In Column 14, Line 8, delete "(NF)" and insert -- (NF), Network --, therefor.

In Column 22, Line 17, delete "SBI24)" and insert -- SIB24) --, therefor.

In Column 22, Line 60, delete "SBI24)" and insert -- SIB24) --, therefor.

In Column 24, Line 29, delete "where" and insert -- were --, therefor.

In Column 24, Line 63, delete "where" and insert -- were --, therefor.

In Column 38, Line 51, delete "Mobility" and insert -- Mobility Management --, therefor.

In Column 39, Line 7, delete "Network Function" and insert -- Network --, therefor.

In the Claims

In Column 40, Line 49, in Claim 3, delete "of any of" and insert -- of --, therefor.

In Column 41, Line 40, in Claim 7, delete "method" and insert -- method of --, therefor.

Signed and Sealed this  
Thirteenth Day of May, 2025

Coke Morgan Stewart  
*Acting Director of the United States Patent and Trademark Office*